(12) United States Patent
Chang et al.

(10) Patent No.: US 10,417,301 B2
(45) Date of Patent: Sep. 17, 2019

(54) ANALYTICS BASED ON SCALABLE HIERARCHICAL CATEGORIZATION OF WEB CONTENT

(71) Applicant: ADOBE INC., San Jose, CA (US)

(72) Inventors: Walter Wei-Tuh Chang, San Jose, CA (US); Kenneth Edward Feuerman, Fremont, CA (US); Shantanu Kumar, Delhi (IN); Ankit Bal, Noida (IN)

( * ) Notice: Subject to any disclaimer, the term of this patent is extended or adjusted under 35 U.S.C. 154(b) by 1391 days.

(21) Appl. No.: 14/482,514

(22) Filed: Sep. 10, 2014

(65) Prior Publication Data

US 2016/0070731 A1 Mar. 10, 2016

(51) Int. Cl.
 *G06F 16/958* (2019.01)
 *G06F 16/28* (2019.01)
 *G06Q 30/00* (2012.01)

(52) U.S. Cl.
 CPC .......... *G06F 16/958* (2019.01); *G06F 16/285* (2019.01); *G06Q 30/00* (2013.01)

(58) Field of Classification Search
 CPC .................................................. G06F 16/285
 See application file for complete search history.

(56) References Cited

U.S. PATENT DOCUMENTS

| | | | | |
|---|---|---|---|---|
| 5,551,027 | A * | 8/1996 | Choy | G06F 9/355 |
| 5,918,236 | A * | 6/1999 | Wical | G06F 17/274 |
| | | | | 704/1 |
| 2002/0022956 | A1* | 2/2002 | Ukrainczyk | G06F 17/218 |
| | | | | 704/9 |
| 2005/0033771 | A1* | 2/2005 | Schmitter | G06Q 30/02 |
| 2007/0214186 | A1* | 9/2007 | Yang | G06K 9/6282 |
| 2008/0021860 | A1* | 1/2008 | Wiegering | G06F 17/30864 |
| 2008/0195587 | A1* | 8/2008 | Hussami | G06F 17/30675 |

* cited by examiner

*Primary Examiner* — Charles E Lu
(74) *Attorney, Agent, or Firm* — Shook, Hardy & Bacon, L.L.P.

(57) ABSTRACT

Various methods and systems for performing analytics based on hierarchical categorization of content are provided. Analytics can be performed using an index building workflow and a classification workflow. In the index building workflow, documents are received and analyzed to extract features from the documents. Hierarchical category paths can be identified for the features. The documents are indexed to support searching the documents for the hierarchical category paths. In the classification workflow, a query, that includes or references content, may be received and analyzed to extract features from the content. The features are executed against a search engine that returns search result documents associated with hierarchical category paths. The hierarchical category paths from the search result documents may be used to generate a topic model of the content associated with the query. The topic model, used for web analytics, includes scores for the hierarchical category paths and for enumerated category topics.

20 Claims, 15 Drawing Sheets

US 10,417,301 B2

ANALYTICS BASED ON SCALABLE HIERARCHICAL CATEGORIZATION OF WEB CONTENT

BACKGROUND

Analytics generally refers to the discovery and communication of meaningful patterns in data. In particular, web analytics includes the measuring, collection, analysis and reporting of web data for purposes of understanding and optimizing web usage. Web analytics may be a tool for business and market research. In this regard, web analytics can be used to assess and improve the effectiveness of websites. Web analytics may include logging web content, such as webpages, that consumers access on particular content provider websites. However, log data provides very little direct information about the content or products that consumers are interested in, because of a limited understanding of the particular content or products on the pages visited. Further, web analytics may implement webpage category classifications to discover patterns in web content. However, category classifications can be limited when the category classifications lack depth and breadth in describing webpage content. As such, conventional web analytics fail to support the understanding of web content to discover consumer interest and intent information.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide methods and systems for performing analytics based on hierarchical categorization of web content. Analytics can be performed using an index building workflow and a classification workflow. In the index building workflow, documents from a knowledge corpus are received and analyzed to extract features from the documents. The features may include leaf categories associated with the documents. Hierarchical category paths can be identified for the features. The documents are indexed to support searching the documents for hierarchical category paths. In the classification workflow, a query, that includes or references content, may be received and analyzed to extract features from the content. The features may be executed against a search engine that returns search result documents associated with hierarchical category paths. The hierarchical category paths, from the search result documents, are used to generate a topic model of the content associated with the query. The topic model, used for web analytics, includes scores for the hierarchical category paths and individual scores for enumerated category topics of the hierarchical category paths.

BRIEF DESCRIPTION OF THE DRAWINGS

The present invention is described in detail below with reference to the attached drawing figures, wherein.

DETAILED DESCRIPTION

Figure 1A:
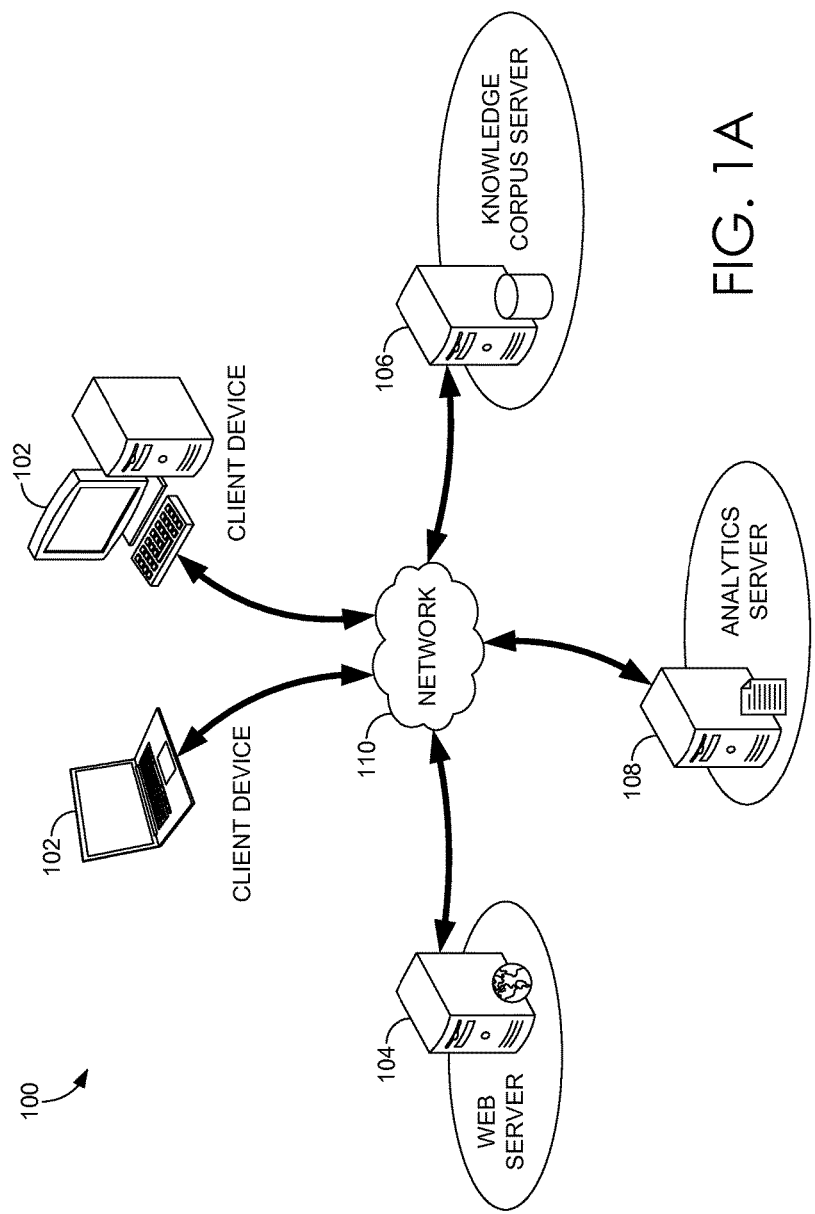
FIGS. 1A-1D are block diagrams showing systems for performing analytics based on hierarchical categorization of web content, in accordance with embodiments of the present invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

Discovering and communicating meaningful patterns in data (e.g., web data) can be based on measuring, collecting, analyzing and reporting data. Such operations, when performed for purposes of understanding and optimizing web usage can be referred to as web analytics. Conventional web analytics methods and systems fail to support the understanding of web data to discover consumer interest, intent, or sentiment information. For example, web analytics may include logging web content, such as webpages, that consumers access on particular content publisher websites. However, log data provides very little information about the content or products of the web pages. In addition, web analytics may include webpage category classifications to discover patterns in web content; however, category classifications can be limited when the category classifications lack depth and breadth in describing webpage content.

Embodiments of the present invention provide simple and efficient methods and systems for performing analytics based on scalable hierarchical categorization of web content. Methods and systems described herein can be implemented with scalability to handle a growing amount of requests in a capable manner or to support the ability to be enlarged to accommodate growth. At a high level, an analytics server can provide components to execute two different workflows. An index building workflow can be performed to generate a categorizer index that indexes documents and corresponding hierarchical category paths of the documents. A classification workflow can then be performed on web content, based on the categorizer index, to generate topic models comprising hierarchical category paths.

A topic model having hierarchical topic categories provides accuracy in understanding web content and discovering consumer interest, intent, or sentiment. For example, a digital publisher may generate a categorizer index using a knowledge corpus and perform a classification workflow using their web content (e.g., collection of digital magazine articles). Topic models based on the collection of digital magazine articles may be used to better understand the collection, such that, it informs the development of new content for the collection. In addition, a content browsing interface may be generated based on the topic models, such that, consumers accessing the web content can more easily discover and review web content from the digital publisher.

With reference to discovering consumer interest, intent, or sentiment, hierarchical topic categories facilitate deeper and broader understanding of web data in order to target users with recommended content and relevant advertising. For example, categorical information (e.g., leather jackets), from a retailer web page selling a leather jacket, provides an advertiser with insufficient information to support performing different types of marketing strategies. While, topic models having hierarchical topic categories (e.g., retail goods→clothing & fashion→outerwear→jackets→leather jackets), generated using a categorizer index, provide rich hierarchical information to measure consumer interest, intent, and sentiment. In particular, inferences can be made based on consumer web log data. For example, a determination that a consumer is likely generally interested in outerwear can be made when a set of subsequently accessed web pages are associated with outerwear but not specifically leather jackets. While, an alternate determination can be made that a consumer is more specifically interested in leather jackets when a set of subsequently accessed pages are associated with leather jackets.

Various terms are used throughout this description. Although more details regarding various terms are provided throughout this description, general definitions of some terms are included below to provider a clearer understanding of the ideas disclosed herein:

A feature refers to a prominent term, phrase or n-gram in a document. A feature may be a leaf category or any other category in a selected document. A feature can include identified text with high frequency in a document.

A document context refers to a plurality of root categories for which the document is analyzed. The document context may be manually generated or based on root categories of a given taxonomy. The document context may be associated with broad classification divisions or specific classification divisions.

Consumer disposition refers to consumer interests, consumer intent, and consumer sentiment. Consumer interest comprises consumer concern, involvement, or draw of consumer attention, to particular content or service. Consumer intent comprises the purpose for performing an action or series of actions, the end or goal that is aimed at. Consumer sentiment includes consumer attitude or opinion on particular content or service Consumer disposition (e.g., interest, intent, or sentiment) can be directed to a variety of web content, by way of example, readership content (e.g., news of specific topics) or products (e.g., clothing).

A knowledge corpus refers to a collection of structured documents. A knowledge corpus can include a large collection of linked articles having category hierarchies.

A hierarchical category path refers to an arrangement of a sequence of categories. The hierarchical category path can start from a root category to a leaf category. The root category indicates a conceptual starting point of a classification division with successive narrower sub-categories associated with the root category.

A categorizer index refers to a construct of organized data that supports the highly specialized task of representing content (e.g., web content) in hierarchical topic categories. The categorizer index may be generated for specific domains or a multi-purpose domain as taxonomies with hierarchical categories. The categorizer index is more than just extracted keywords or phrases to indicate topics, but rather further comprises hierarchical categorization of topics. The categorizer index can, in particular, be implemented using category feature vectors (FV). As such, the categorizer index can also be referred to as a hierarchical topic categorizer index or a category feature vector index.

In operation, the categorizer index can be generated using a specific interested party ontology (e.g., a publisher's ontology). The process might include a manual identification of different categories, followed by, semi-supervised machine learning for hierarchy of categories. The hierarchical categories may be a merged into the categorizer index of the identified hierarchical categories associated with the ontology.

In an alternate embodiment, the categorizer index can be generated using a knowledge corpus of categories and articles. One or more corpora that include linked articles and category hierarchies are contemplated with embodiments of the present invention. In one embodiment, the categorizer index is generated using an external knowledge corpus (e.g., WIKIPEDIA). An external knowledge corpus can include over millions of individual categories and linked articles. Categories in the external corpus may be specifically be pruned to filter our hierarchical categories that may not be relevant for a general purpose domain or a specific domain for a particular interested party. The articles may be analyzed to extract features that are most representative of the article. In particular, a term frequency inverse document frequency (tf-idf) analysis can be performed on the documents such that the extracted features from an article may be used to generate a collection of terms associated with the article and also identify a subset of shortest hierarchical category paths of the article. The category features may be modeled in a feature vector space.

The external knowledge corpus can also be associated with a plurality of languages that facilitate generating the categorizer index for a particular language. It is contemplated that embodiments of the present invention may leverage a multilingual corpus in generating the categorizer index to easily localize to any number of languages supported by the underlying knowledge corpora. By way of example, with WIKIPEDIA, the topic category ontology and training corpus is available in 287 languages. It is further contemplated that the categorizer index can be periodically rebuilt, such that, it includes the most up-to-date content of the external corpus. As such, the categorizer index may be rebuilt and deployed in near real-time and/or on demand as new categories and subjects are added to the associated knowledge corpus.

Upon building the categorizer index, a topic model can be automatically generated using web content (e.g., individual webpages or websites) or other types of input (e.g., keywords/phrases). In an exemplary implementation, individual pages or sets of pages identified from web log data, for a user or user segment, can be used to generate a topic model of web content referenced in the web log data. The web pages may be analyzed in near-real time or a batch of pages may be aggregated for a designated period of time and analyzed, as a user or user segment accesses web content. Additionally or alternatively, the web content may be analyzed in a batch workflow that analyzes a collection of web content, to generate topic models. The topic models can be analyzed to discover consumer disposition. In embodiments, an interested party can have an on premise implementation of the analytics sever to provide analytics functionality or subscribe to a service to provide the analytics functionality described herein. In other embodiments, the functionality of the analytics server can be provided via a cloud computing system, where the cloud system computing provides computing as a service with shared hardware and software resources. The cloud computing system may also support a scalable implementation of the analytics server.

In operation, a reference to web content (e.g., URL, or document identifier) and other input (e.g., keywords/phrases) may be received as queries and analyzed using the categorizer index. Queries can be generated as feature vector (FV) representations of the content associated with the queries. Content can include new and unknown webpages using html text, page URLs, document identifiers, and other forms of accessing and representing web content. Content can be, in particular, selected from web log data of consumers visiting websites. Generating a query FV can include utilizing statistics-based methods to extract key text features from the content associated with the query. For example, tf-idf can be used to identify word n-grams in web content to determine the raw frequency of text features in the web content. Other methods of extracting key text features in the web content are contemplated with embodiments of the present invention.

The extracted text features can be used to build a FV representation of the query web content. The query FV can be diagrammatically represented in the feature vector space of the extracted text features from the web content. Each dimension corresponds to a separate text feature, such that, if a text feature occurs in a document, its value in the vector space is non-zero. The query FV can be used to identify hierarchical topic categories from the categorizer index. Identifying the hierarchical topic categories can be based on the highest similarity between the query FV and the categorizer index category FV. It is contemplated that a specialized search engine performs the comparison between the query FV and the categorizer index category FV when identifying the hierarchical topic categories for a topic model.

In embodiments, the topic model may further be used for tagging web content. In particular, the hierarchical categories may be used as descriptive labels for web content. As such, web content can be associated with specific hierarchical categories that describe the content. The hierarchical categories may be embedded as metadata of the web page or displayed in a defined manner alongside the web content. Other variations of associating the web page with topic model hierarchical categories are contemplated with embodiments of the present invention.

In operation, a subset of hierarchical categories may be selected from a topic model of a web page. Hierarchical topic categories may be scored to indicate the relative significance of a hierarchical category to the web content. As such, selecting the subset of hierarchical categories may be based on a score associated with the topic model hierarchical categories. The score may be used for ranking, prioritizing, and filtering the identified hierarchies and depth levels of hierarchy that are used in tagging the web content. It is contemplated that selected hierarchy categories may be weighted up or weighted down in identifying hierarchical categories that may be used to tag web content.

In embodiments, the topic model may be formatted as a matrix in which rows are associated with individual users or segments of user. The users or segments of users may be associated with a selected attribute (e.g., particular demographic information). The matrix columns can be associated with hierarchical categories. The matrix can be used to perform analysis (e.g., regression or singular value decomposition) to identify relationships to infer consumer disposition of new and existing users or segments of users. For example, an advertiser may make recommendations to a user based on analyzing hierarchical categories in the matrix. As such, the topic model in any output format provides broader and deeper coverage for topics in web content to support analytics.

Accordingly, in a first aspect of the present invention, one or more computer storage media storing computer-useable instructions that, when executed by one or more processors, causes the one or more processors to perform a method for performing analytics based on hierarchical categories, are provided. The method comprises identifying a plurality of features associated with a document in the plurality of documents from a knowledge corpus. The method also includes identifying a document context analyzing the plurality of features. The method further includes generating a hierarchical category path for a selected feature from the plurality of features and the document context. The method also includes creating an index entry for the document associated with the selected feature and the hierarchical category path.

In a second aspect of the present invention, a computer-implemented method suitable for use in a computing environment utilizing a processor and a memory for performing analytics based on hierarchical categories is provided. The method includes receiving a classification engine query that references web content. The method also includes identifying a plurality of features associated with the web content referenced by the classification engine query. The plurality of features is represented as feature vectors in a vector space of the plurality of features. The method also includes transmitting the feature vectors as search engine query feature vectors. The method includes receiving documents identified based on the search engine query feature vectors. The documents are identified based on a similarity between the search engine query feature vectors and feature vectors associated with documents indexed in the categorizer index. The method also includes identifying hierarchical category paths associated with the documents. The method includes creating a topic model comprising the hierarchical category paths. The method also includes generating topic model scores associated with the hierarchical category paths. The method further includes communicating the topic model comprising the hierarchical category paths and the path scores.

In a third aspect of the present invention, a system for performing analytics based on hierarchical categories is provided. The system includes a categorizer index build component configured for identifying a plurality of features associated with a document in the plurality of documents; identifying a document context for analyzing the plurality of features; generating a hierarchical category path for a selected feature using the plurality of features and the document context; and creating an index entry for the document associated with selected feature and the hierarchical category path. The system further includes a classification engine component configured for: receiving a classification engine query; identifying a plurality of features associated with the classification engine query; transmitting a feature from the plurality of features as a search engine query; receiving a document identified based on the feature as the search engine query; identifying a hierarchical category path associated with the document.

Turning now to FIG. 1A, an example analytics infrastructure ("infrastructure") 100, in which embodiments of the present invention may be performed, is shown. The infrastructure 100 is an example of one suitable infrastructure. The infrastructure 100 should not be interpreted as having any dependency or requirement related to any single module/component or combination of modules/components illustrated therein. Each may comprise a single device or multiple devices cooperating in a distributed environment. For instance, components may comprise multiple devices arranged in a distributed environment that collectively provide the functionality described herein. Additionally, other components not shown may also be included within the network environment.

The infrastructure 100 may include client devices 102, web content server 104, knowledge corpus server 106, analytics server 108, and network 110. The network 110 may include, without limitation, one or more local area networks (LANs) and/or wide area networks (WANs). Such networking environments are commonplace in offices, enterprise-wide computer networks, intranets and the Internet. Accordingly, the network 110 is not further described herein.

Any number of client devices and servers may be employed in the infrastructure 100 within the scope of embodiments of the present invention. Each may comprise a single device/interface or multiple devices/interfaces cooperating in a distributed environment. For instance, the analytics server 108 may comprise multiple devices and/or modules arranged in a distributed environment that collectively provide the functionality of the performing analytics based on scalable hierarchical categorization of web content. Additionally, other components/modules not shown also may be included within the infrastructure 100.

It should be understood that this and other arrangements described herein are set forth only as examples. Other arrangements and elements (e.g., machines, interfaces, functions, orders, and groupings of functions) can be used in addition to or instead of those shown, and some elements may be omitted all together. In particular, other arrangements may support scalable implementations of embodiments of the present invention. The infrastructure 100 can be scalable to handle a growing amount of requests in a capable manner or to support the ability to be enlarged to accommodate growth, as described in more detail herein.

Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The client device 102 may include any type of computing device 900 described below with reference to FIG. 9, for example. The client device 102 can provide access to different web content, for instance, web sites that comprise a set of related web pages typically served from a single web domain. A website is hosted on at least one web server (e.g., web server 104), accessible via a network (e.g., network 110) such as the Internet or a private local area network through an Internet address known as a Uniform resource locator (URL). Client device 102 can in the alternative provide access to the analytics sever 108 and output of the analytics server 108 from performing analytics on web content, as described further herein.

The web server 104 is configured to store, process and deliver web pages to client devices 102. The communication between client devices 102 and the web server 104 takes place using the Hypertext Transfer Protocol (HTTP). Pages delivered are most frequently HTML documents, which may include images, style sheets and scripts in addition to text content. A user agent, commonly a web browser or web crawler, initiates communication by making a request for a specific resource using HTTP and the server responds with the content of that resource. Web content can include posted content and selling of contextual advertising either through direct sales or through an advertising network, e-commerce—products or services purchased directly through a website, advertised products or services available at a brick and mortar business, and freemium—basic content is available for free but premium content is paid. Other types of web content are contemplated with embodiments of the present invention.

Access to web content on web server 104 can be logged. Logging access to web content can be performed using several different types of techniques that generate web access logs. In particular, a web server can maintain a history of page requests. Web logs can be in standard World Wide Consortium (W3C) format—the common log format or other proprietary formats. Information about the request, including client IP address, request date/time, page requested, HTTP code, bytes served, user agent, and referrer are typically added. Web logs based on consumer access from client devices can be used in analytics in accordance with embodiments of the present invention.

Figure 1B:
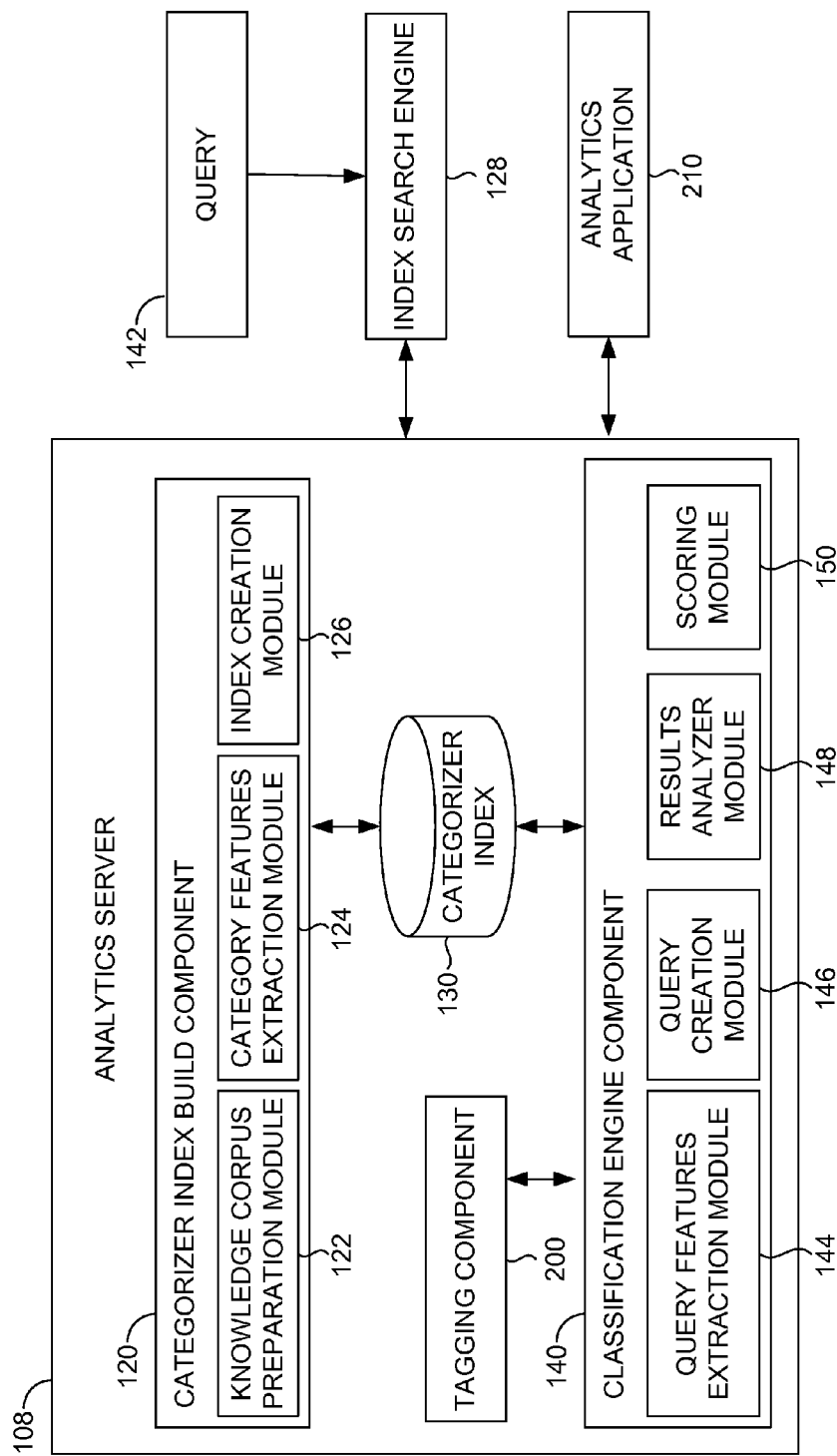

A knowledge corpus server 106 can facilitate generating the categorizer index 130 of FIG. 1B. The categorizer index 130 can be generated using the knowledge corpus server 106 that stores hierarchical categories and articles. In one embodiment, the categorizer index 130 is generated using an external knowledge corpus (e.g., WIKIPEDIA). An external knowledge corpus can include over millions of individual categories and linked articles. The external knowledge can also be associated with a plurality of languages that facilitates generating the categorizer index for a particular language. It is contemplated that embodiments of the present invention may leverage multilingual corpora in generating the categorizer index 130 to easily localize to any number of languages supported by the underlying knowledge corpora. By way of example, with WIKIPEDIA, the topic category ontology and training corpus is available in 287 languages.

One or more corpora that include linked articles and category hierarchies are contemplated with embodiments of the present invention.

The analytics server 108, further described in FIG. 1B, facilitates the discovery and communication of meaningful patterns in data. In particular, the analytics server 108 may operate with additional components and modules in the infrastructure 100 to perform analytics based on scalable hierarchical categorization of web content. The analytics server 108 may include a categorizer index build component 120 and a classification engine component 140 that facilitate implementing process workflows for generating the categorizer index 130 and topic models, respectively. The analytics server may further include a tagging component 200 for associating web content with hierarchical categories as descriptive labels, and analytics application for performing additional processing based on analytics server output. In this regard, the analytics server 108 generates different types of output including the categorizer index 130 based on the knowledge corpus 106, a topic model of hierarchical categories based on both the categorizer index 130 and a query FV, and tagged web content based on the hierarchical categories of the topic models.

The generated categorizer index 130 is a construct of organized data that supports the task of representing content (e.g., web content) in hierarchical topic categories. The categorizer index 130 can be implemented as category feature vectors (FV) in an index. Topic models are generated from the categorizer index 130 and are analyzed to identify consumer disposition such that interested parties can develop market strategies including segmenting and targeting. In one example, the invention can also be used by interested parties (e.g., digital publishers) in building models of consumer disposition. The hierarchical topic categories of topic models generated from a digital publisher's web content can be used to model content of articles that readers are interested in. Similarly, target analysts that need to understand product interests and product intentions of web content, can use the hierarchical topic categories of topic models to discover this information.

With continued reference to FIG. 1B, the categorizer index build component 130 is responsible for generating the categorizer index 130. The categorizer index 130 can include highly diverse and detailed category topics. The categorizer index build component 130 may implement an index building workflow in building the categorizer index 130. The categorizer index build component 130 may implement a service application that performs the functions of the pre-processing workflow. By way of example, the service application provides a processing interface to send and receive service requests to internal and external components and modules in building the categorizer index.

The index building workflow utilizes knowledge corpus server 106, knowledge corpus preparation module 122, category features extraction module 124, index creation module 126, and index search engine module 128. The knowledge corpus server 106 comprises linked documents associated with categories. Documents can be associated with one or more categories. In one embodiment, the WIKIPEDIA corpus, that includes documents and human-created categories associating the documents to categories, can be used during the index building workflow. It is contemplated that a plurality of corpora may be used in embodiments of the present invention to generate the categorizer index 130 to include information from each of the corpora. The index building workflow can identify a specific language for which the categorizer index is being built when the knowledge corpus is associated with several languages.

In operation, the knowledge corpus preparation module 132 accesses the knowledge corpus data from the knowledge corpus server 106. The knowledge corpus preparation module 132 is responsible for preparing the corpus data for next steps in the workflow. For example, the knowledge corpus preparation module 122 can parse and clean up markup tags to extract information from the knowledge corpus. At this step, it may be possible to identify the total number of articles and categories. This information on total number of articles and categories may be used for determining and evaluating updates to the knowledge corpus. As such, the category index may be rebuilt upon determining updates to the knowledge corpus.

The features extraction module 134 is responsible for processing the data from the knowledge corpus preparation module 122. Processing the data can include identifying feature vectors for each of the articles (or document) in the corpus data and corresponding category hierarchies. In the corpus data, an article include can a several different features, such as, leaf level categories. A relevant hierarchical category path can be generated from root categories to leaf categories for each feature vector associated with an article in the corpus data.

In operation, root level categories can be identified. The root level categories define the document context. A root category can indicate a conceptual starting point of a classification division. A root category can include the broadest representation of a classification division with successive narrower subcategories associated with the root category. Identifying root level categories may be for a specific domain or a general purpose domain. Identifying the root level categories may also be a manually curated process. Exemplary root level categories can include: Agriculture, Arts, Business, Chronology, Concepts, Culture, Education, Environment, Geography, Health, History, Humanities, Humans, Language, Law, Life, Mathematics, Medicine, Nature, People, Politics, Science, Society, Sports, Technology. Other types of selected root level categories are contemplated with embodiments of the present invention.

Next, using the leaf category of a feature vector for a term in an article in the corpus data, k shortest paths from each leaf category to reach any of the root categories are identified. By way of example, a WIKIPEDIA article (e.g. about Barrack Obama), may be parsed and to extract the immediate WIKIPEDIA categories (leaf categories) associated with the article (e.g. "President of United States", "Harvard Law School Alumni") as features. A hierarchical category path of this article from root categories (e.g., Politics, Education) to leaf categories may be identified using the WIKIPEDIA corpus. In this regard, if an article has N categories, the k×N category hierarchies from the root categories for that article can be generated.

The index creation module 126 is responsible for creating an optimized feature vector for a selected feature. The index creation module 126 receives the output from the category features extraction module 136 and creates the optimized feature vector for the selected feature. In operation, each filtered tf-idf feature list of a selected document is configured into a search-platform-formatted document associated with a search platform (e.g., APACHE SOLR). The search-platform-formatted document includes fields for title, text, and feature categories. It is contemplated that the title field can be indexed without removing stop words. Stop-words refer to selected words which are filtered out prior to, or after processing of natural language data. Stop-words can contribute a significant role in the title (e.g., stop words in movie titles—THE DARK KNIGHT) whereas stop words are removed from article text before term feature vector creation and indexing is performed. The index creation module 136 is further responsible for dividing the feature vector index into N parts. The division is contemplated in embodiments to support a multi core search feature of the search platform, as discussed in more detail below. The index creation module 126 generates index entries, in the categorizer index 130, for the documents associated with the feature categories and the hierarchical category paths.

With continued reference to FIG. 1B, the index search engine module 128 is responsible providing a search platform (e.g., APACHE SOLR). The index search engine module 126 retrieves data from the categorizer index 130 comprising a document category term feature vector index to support search functionality. It is contemplated that embodiments of the present invention may be implemented in a scalable manner. The infrastructure 100 can support the categorizer index 130 using multiple cores across processing nodes, or a single core on one node. In a multi-core set up, one main search engine instance and one or more other secondary search engine instances can be started (e.g., APACHE SOLR core). The main instance can act to run an orchestration/coordination process.

In embodiments of the present invention, an orchestration and query dispatch system can implemented to distribute in parallel any query to all nodes. The orchestration and query dispatch system can merge the results returned from all the search engines modules. Since a single node searches only a small portion of the categorizer index 130 and each node searches in parallel with other nodes, the overall search time is reduced in proportion to a factor of M in the multi-core configuration where there are M nodes. This speed up is due to smaller categorizer index partitions and higher bandwidth in the request pipeline.

With continued reference to FIG. 1B, the classification engine component 140 is configured to generate a topic model for a received query 142. In particular, the classification engine component 140 can receive query 142 associated with web content and generate topic model categories for the web content. Query 142 can be associated with short text queries (e.g., keyword, phrases) or full document web pages when sent to the classification engine component 140.

The classification engine component 140 may implement a classification workflow in building the topic model. The classification engine component 140 may implement a service application that performs the functions of the classification query workflow. By way of example, the service application provides a processing interface to send and receive service requests to internal and external components and modules in classifying the query 142. The classification engine component can include a query features extraction module 144, a query creation module 144, a results analyzer module 148, and a scoring module 150.

In operation, query 142 can be submitted to the classification engine component 140. The query features extraction module 144 is responsible for extracting features from the text of the query input 142. By way of example, a text engine n-gram extraction service (e.g., SEDONA) can be used to extract text n-grams. In one embodiment, up to five grams are selected and the text engine extraction server can be configured to break the n-gram upon encountering stop words. The query features extraction module 144 can be configured to transmit the features for additional processing.

The query creation module 146 is responsible for identify features for additional processing. In one embodiment, a subset of the features can be determined. For example, the query creation module 146 may identify top k (e.g., 40) features. The query creation module 146 may sort the features according to term frequencies. The query creation module 146 can also construct queries to be transmitted for searching (e.g., on a search platform—APACHRE SOLR) by weighing each term with a square root of its term frequency.

It is contemplated that short and long documents can be handled differently. In particular, short queries consist of few very concise terms and match indexed titles better than an entire article text as represented by the indexed article feature vector. Long queries, on the other hand, consist of more topics and themes and thus better match the feature vector from the article body text indexed by the categorizer index. During the index build workflow, an article title metadata is used for the short document text and article body text is used for the long document text.

In operation, for a long document, a query to be executed using the categorizer index via the index search engine module 146 is constructed for the text field. For short documents, a hybrid approach can be employed in which a query is executed separately for both the title and text fields and the top documents are identified for both searches and results analyzed in the result analyzer module 150. As such, a query (or queries for short document) is submitted to the index search engine module 126, which then generates the top matched documents. Distinguishing a short document from a long document can be based on an empirically determined term count threshold.

The result analyzer module 148 is responsible for analyzing documents to identify corresponding category hierarchy paths. In particular, the result analyzer module 148 analyzes the top matched documents from the index search engine 128. In embodiments, the results of the long and short documents can also be handled differently. It is contemplated that for long documents, results correspond to the search executed on text field. Hierarchical category paths can be identified for top matched documents. For short documents, the results correspond to the searches executed in the text field and the title filed. As such, top documents are identified for both of the searches by using various approaches, such as, jaccard similarity coefficient or simple aggregation. Once the top documents are identified, their corresponding category hierarchy paths can be found and scores aggregated similar to long documents. Top categories identified from the result analyzer module 148 can be provided as output categories for the input document. The scores for the category hierarchy paths can also be identified for top matched documents using the scoring module 150.

The scoring module 150 is responsible for generating scores associated with hierarchical categories. The scores may be used as indicators of consumer disposition. In operation, for a selected webpage or selected by a URL, or a basic query given by keyword terms, the computed topic model TM [URL/query] is an ordered set of M tuples consisting of: (hierarchical category topic path P, path score $\Omega p$).

```
TM [URL/query] = {
    ( hierarchical category topic path 1, path score $\omega_{P1}$ ),
    ( hierarchical category topic path 2, path score $\omega_{P2}$ ),
        ⋮
    ( hierarchical category topic path M, path score M )
}
```

A hierarchical category topic path itself is a full enumeration of category topics from the classification ontology from root category to leaf:

Hierarchical Category Topic Path=[Root-category, Sub-category, Sub-Sub-Category, . . . ]=[$C_1, C_2, \ldots, C_i, \ldots C_q$] q designates the leaf level.

To compute the topic model scores for a single page, individual topic category scores can be calculated by summing the score contributions from the lowest (leaf) levels in the category path for each immediate parent, then propagating this information up to the root level of the ontology. At each stage of the score summing process, individual total category occurrence counts are normalized by the total number of contributing subcategories to given a contribution score between (0.0 and 1.0) with the sum of score contributions always totaling 1.0 for each parent category. If $\Omega_{C_i}$ designates the score for individual category $C_i$ then $\Omega_{C_i}$ is computed by summing the $\Omega$ scores for each j'th child (sub category) of $C_i$ indicated in the equation below by $C_{ij}$:

$$\omega_{Ci} = k^{-1} \times \alpha_\ell \sum_{j=1}^{k} \omega_{Cijt} = (\omega_{Ci1} + \omega_{Ci2} + \ldots + \omega_{Cij} + \ldots + \omega_{Cik})$$

The above equation gives the scores for topic categories for a single web page or query. To compute the aggregate topic model across a given time window with $T_N$ models for each time sample t, model scores for each category $C_{it}$ are aggregated $$\omega_{CiT} = (TN \times k)^{-1} \times \alpha_\ell \sum_{t=1}^{T_N} \sum_{j=1}^{k} \omega_{Cijt}$$
$$= (\omega_{Ci11} + \omega_{Ci21} + \ldots + \omega_{Cij1} + \ldots + \omega_{Cik1}) +$$
$$(\omega_{Ci12} + \omega_{Ci22} + \ldots + \omega_{Cij2} + \ldots + \omega_{Cik2}) +$$
$$\vdots$$
$$(\omega_{Ci12} + \omega_{Ci22} + \ldots + \omega_{Cij2} + \ldots + \omega_{CikTN})$$

Figure 4A:
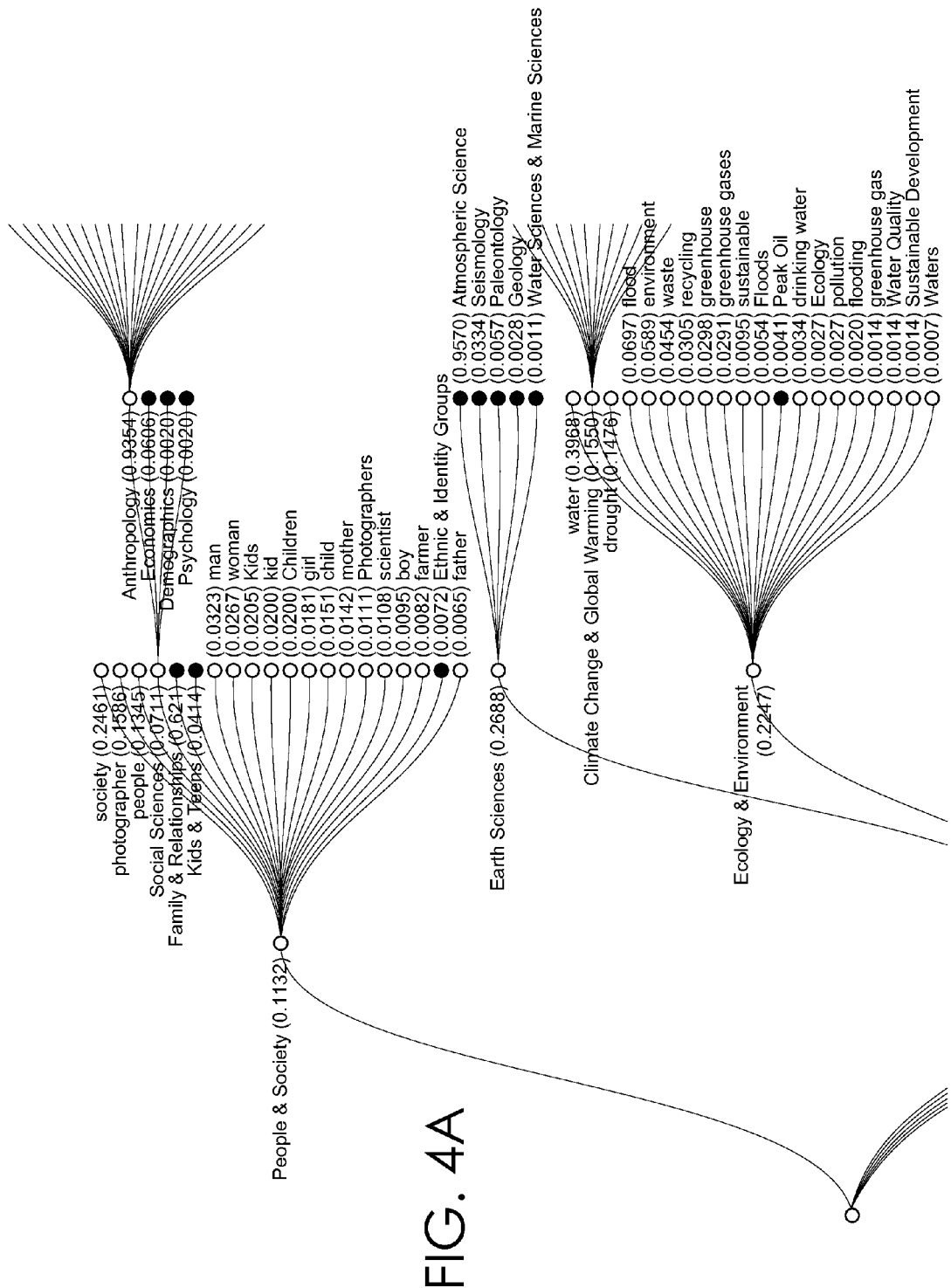
FIGS. 4A-4B are exemplary topic model diagrams for performing analytics based on hierarchical categorization of web content, in accordance with embodiments of the present invention.
Figure 4B:
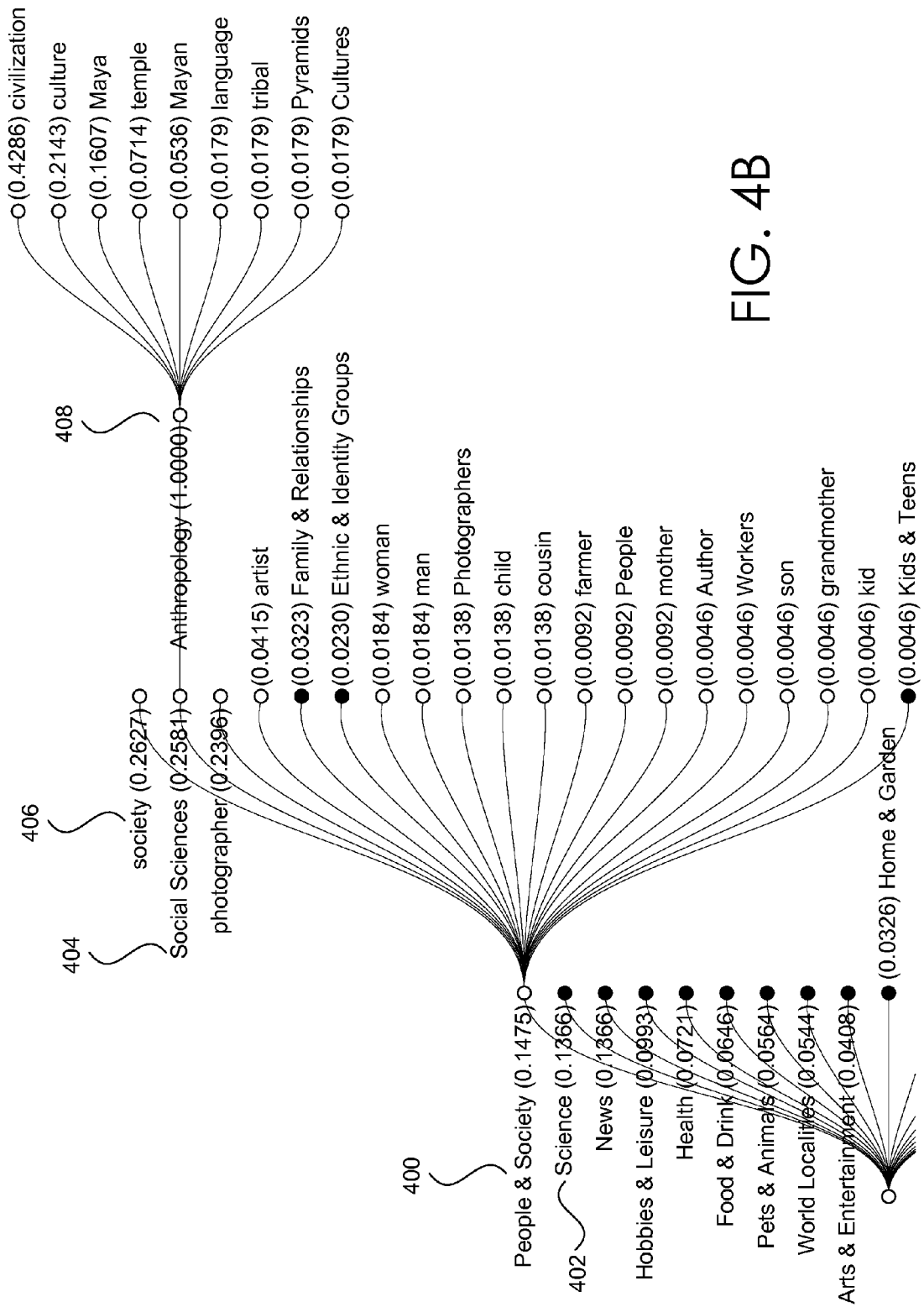

Exemplary scores computed by these two equations are shown in FIGS. 4A and 4B.

It is contemplated that the $\alpha_l$ coefficient may be used if a non-uniform score weighting scheme is desired to over-weight or underweight category scores at any level l, otherwise this coefficient is set to 1.0. When !=1.0, the value of $\alpha_l$ used corresponds to the hierarchical path level at which Ci occurs. The scoring algorithm described above is meant to exemplary and not limiting. As such, other variations and combinations of scoring algorithms are contemplated with embodiments of the present invention.

The tagging component 200 can be used to tag web content with topic model hierarchical categories as descriptive labels. The web content can be associated with specific hierarchical categories that describe the content. The hierarchical categories may be embedded as metadata of the web page or displayed in a defined manner alongside the web content. Web content may be received at the analytics server 108 and analyzed using the categorizer index 130 to generate a topic model. The tagging component 200 receives the web content and the corresponding topic model in order to tag the web content with the hierarchical categories.

In operation, a subset of hierarchical categories may be selected from a topic model of a web page. Hierarchical categories may be scored using the scoring module 150 to indicate the relative significance of a hierarchical category to the web content. As such, selecting the subset of hierarchical categories may be based on a score associated with the topic model hierarchical categories. The score may be used for ranking, prioritizing, and filtering the identified hierarchies and depth and breadth levels of hierarchy that are used in tagging the web content.

The tagging component 200 may implement a plurality of tagging rules for tagging web content with particular hierarchical categories. An entire website, individual pages, and or portion of web page content may be tagged with hierarchical categories. The tagging rules can be associated with specific domains or particular characteristics of the web content. For example, tagging rules for retailer content may be different from digital magazine publishers. Tagging rules may specifically be based on the scores associated with topic model categories. For example, a threshold score may be defined for the depth or breadth of a topic model, such that, a hierarchical category that is used to tag content includes at least a minimum score. The threshold score may be associated with a particular depth level or breadth level. In the alternative, a particular number of levels of depth and breadth in categories may be selected for tagging web content. It is contemplated that selected hierarchical categories may be weighted up or weighted down in identifying hierarchical categories that may be used to tag web content. Other variations and combinations of the tagging rules are contemplated with embodiments of the present invention.

The analytics server 108 can communicate the generated topic model associated with query 142 to an analytics application 210. Analytics application 210 can be associated with interested parties that run the analytics applications to understand consumer disposition. Analytics application 210 can aggregate hierarchical category paths and scores into a multi-level interest model that reflects the user or user segments topic interests for a given time window for which web page level topic models are computed. It is contemplated that the analytics application 210 may receive matrix representation of the topic model to perform analysis. For example, consumer disposition may be discovered based on analyzing the matrix representations of the topic model. Analytics application 210 may also analyze near-real time or batch processed user web pages to make inferences about consumer disposition. For example, inferences may be made based on analyzing webpage hierarchical category paths and corresponding scores, which is distinguishable from merely analyzing a collection of terms or categories without hierarchical relationship, associated with a web page.

Figure 1C:
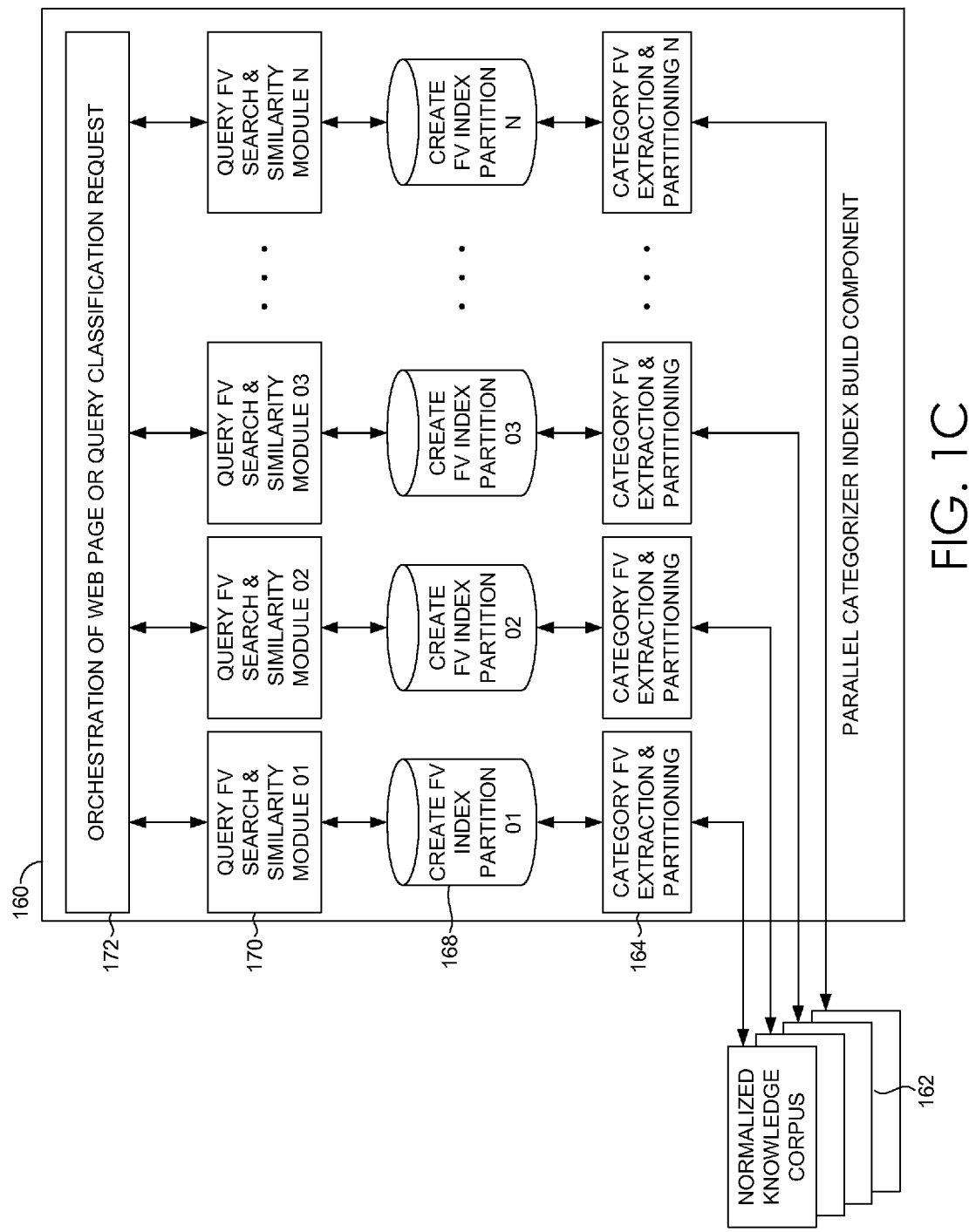
Figure 1D:
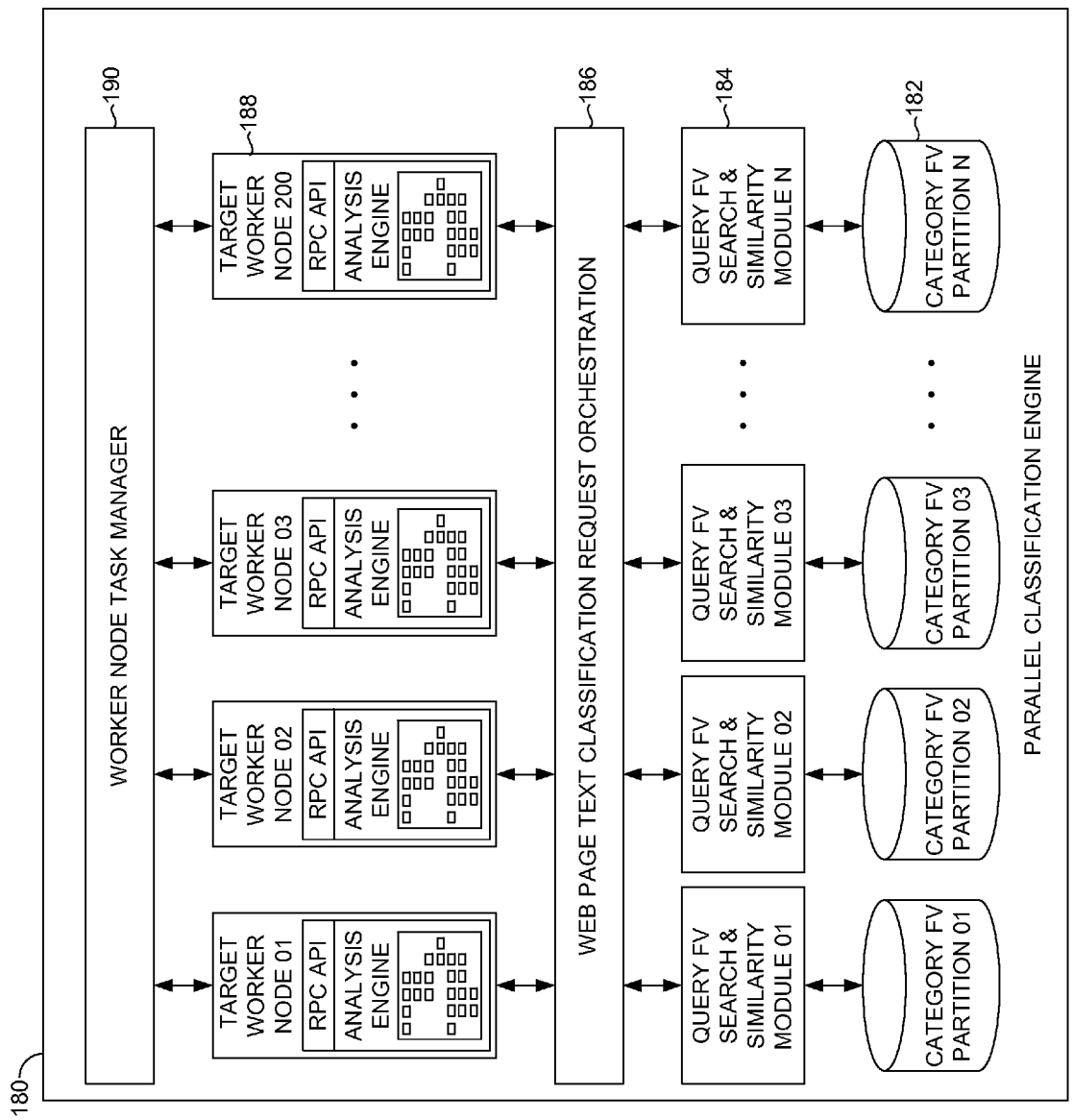

With reference to FIGS. 1C and 1D, in embodiments, the functionality supported using the analytics server is scalable to support high web content query request volumes. In operation, a scalable implementation leverages multiple processing nodes for parallel implementations of the categorizer index component 120 and classification engine component 140 that utilize partitioning and distribution of the categorizer index across multiple processing nodes, as discussed more detail below. A scalable implementation supports parallel text classifier construction that allows new topical information to be quickly incorporated into the system. New information can be based on updates to the knowledge corpus or directly learned from content web pages. Parallel run-time query execution to compute classifications allow a high volume of webpage analysis requests to be sent to the system and topic model results to be quickly computed for each request.

A scalable implementation can include a parallel categorizer index build component 160 and parallel classification engine components 180. The parallel categorizer index build component 160 utilizes a normalized knowledge corpus 162, category FV extraction and partitioning module 164, create FV index partition module 168, query FV search & similarity module 170, and orchestration of web page or query classification request module 172. It is contemplated that in embodiments that the parallel categorizer index build component 160 can perform the functions of the categorizer index build component 120. The parallel categorizer index build component 160 is additionally responsible for updating the categorizer index periodically based on a predefined period of time. The predefined period of time can be defined as once every few days.

The parallel classification engine component 180 utilizes a category FV partitioning module 182, a query FV search & similarity module 184, a web page text classification request orchestration module 186, a target worker node 188, and worker node task manager 190. It is contemplated that in embodiments that the parallel classification engine component 180 can perform the functions of the classification engine component 140. The parallel classification engine component 180 can be responsible for categorizing and tagging new documents and queries submitted to the system. The parallel classification engine component 180 may execute classification at run-time.

Embodiments of the present invention may be implemented via a cloud computing platform. In particular, a scalable implementation can be implemented using a cloud computing platform that comprises components described herein in a distributed manner. A cloud computing platform may span wide geographic locations, including countries and continents. The cloud computing platform may include nodes (e.g., computing devices, processing units, or blades in a server rack) that are allocated to run one or more portions of the components of the present invention. Components may be partitioned into virtual machines or physical machines that concurrently support functional portions such that each functional portion is able to run on a separate virtual machine.

In operation, the parallel categorizer index build component 160 can implement a parallel categorizer index build workflow. During the workflow, the knowledge corpus that contains category ontology and associated exemplar documents is submitted to the category feature extraction and partitioning module to produce category index partitions across N nodes each assigned to a processing core. The parallel classification engine can implement a parallel classification workflow that retrieves the category feature vector index formed by N partitions. The category feature vector index 130 is made available to one or more query index engines which submit queries against the build index. Requests to each index engine are dispatched by an orchestration system. The computation structure of the scalable implementation provides for horizontal scaling that can support massive category indexes and a large number of concurrent application requests.

In a scalable computing platform embodiment, the scalable computing platform can include a worker node architecture that provides scalability through a task manager which dispatches webpage classification requests in a production workflow to each worker node client. A worker node 188 client then communicates a request URL to the analysis engine which fetches the web page content using the input URL, performs html extraction, sentence segmentation, term tokenization, and n-gram extraction to create input query or document FVs. The resulting query/document FV is dispatched to the classification orchestration module 186 that uses an available search and similarly module to computer the hierarchical topic categories.

Figure 2:
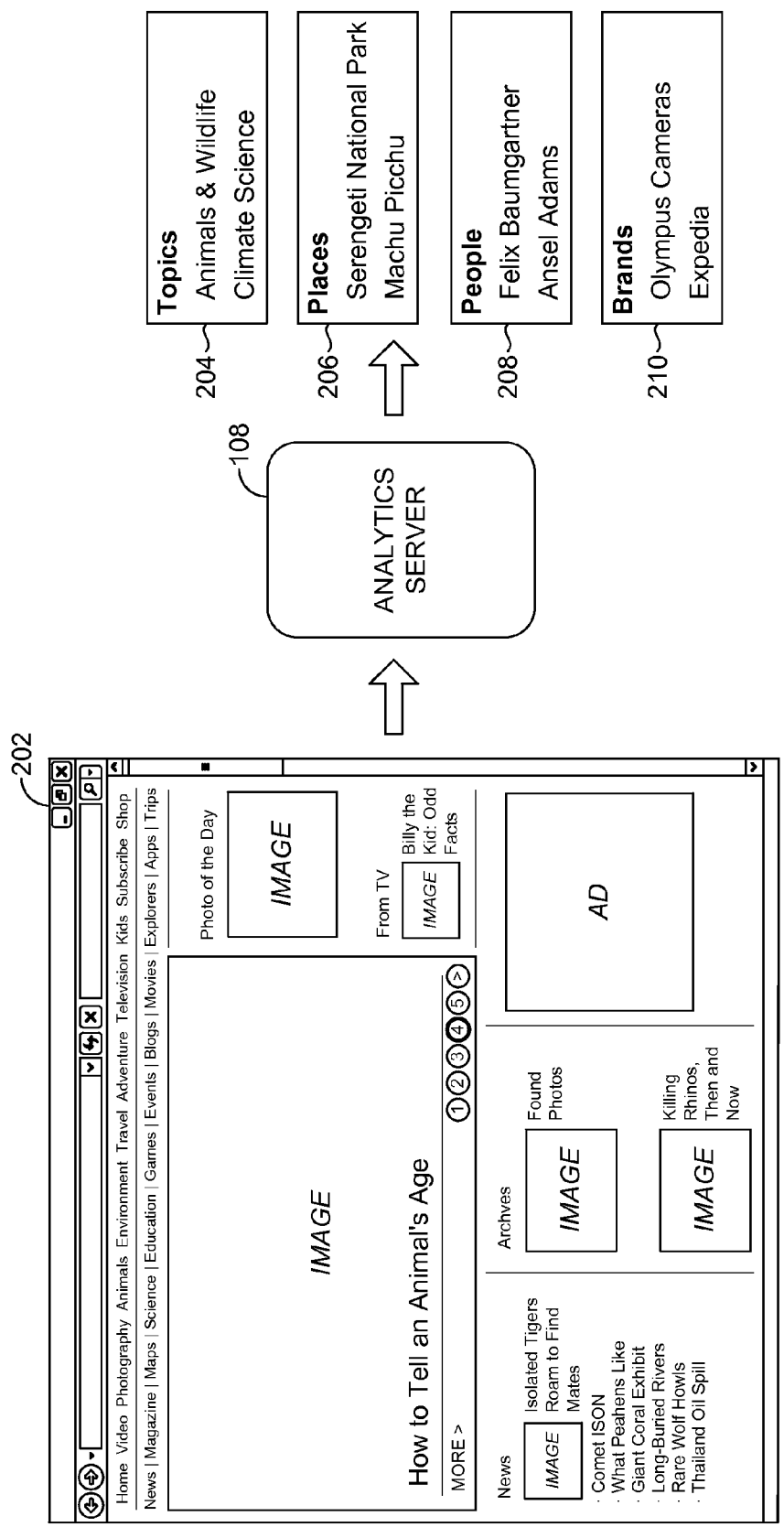
FIG. 2 is a schematic diagram showing a method for performing analytics based on hierarchical categorization of web content in accordance with embodiments of the present invention.

Turning to FIG. 2, embodiments of the present invention can further be described by way of example to provide details on analytics based on hierarchical categorization of web content. Hierarchical categorization can be used in two broad exemplary implementations—digital publishing and market strategy—as discussed in examples below. With reference to digital publishing, in one example, a content publisher (e.g., NATIONAL GEOGRAPHIC) may be interested in learning a distribution of topics in the content provided by content publisher website. Identifying the topic categories can help the content publisher make decisions on new and different content that could be added to the website.

In another example, a consumer (e.g., reader of web content on NATIONAL GEOGRAPHIC) may be interested in learning the topics available on a given website. Knowledge of these topics allows the user to easily browse through content available on the website and discover content that would otherwise have been difficult to find or not found at all. In particular, a hierarchical categories representation of the topic on a website may be presented via the website itself to the consumer. The hierarchical categories in particular may be selectable to the individual web page or web pages associated with the category. As such, the consumer may browse the website directly from the hierarchical category visualization of the website.

In yet another example, a content publisher may be interested in finding out what topics readers are most interested in over time. Knowledge of these topics allows content publishers to recommend additional related content and advertising. With each of the above example, embodiments of the present invention provide a categorizer index which may be used to analyzed web content to generate topic models of hierarchical topic categories. It is contemplated that analysis of the web content can be performed at different times. For example, when new pages are published (i.e., pages that have not been previously crawled and analyzed) or when changes to existing pages are detected. Other mechanisms for triggering analysis of web content are contemplated with embodiments of the present invention.

In operation, an analytics server 108 identifies and extracts topics from web content 202 topics 204, places 206, people 208 and brands 210. Content text can be retrieved from several different sources, including, one or more website crawler technologies as described in Adobe Patent Docket 2898US01/U.S. patent application Ser. No. 14/054,291, incorporated herein in its entirety. A web crawler (e.g., a web crawler module) may be an internet bot that systematically browses selected web content. Content text can also be retrieved from Portable Document Format (PDF) documents hosted on a publisher's website.

Figure 3A:
FIGS. 3A-3C are exemplary web content and topic model diagrams, in accordance with embodiments of the present invention.

With reference to FIG. 3A, webpage 300 can be encoded using html and contains content text that is extracted and then sent to query features extraction module 144. Extracted features in the form of word n-grams are then used to query the categorizer index 130. The categorizer index 130 consists of example documents associated with hierarchical categories. Content text, of the sample NATIONAL GEOGRAPHIC web content 302, is indicated by html markup, such as, <p> tags and is first extracted by a website crawler (not show). It is contemplated that boilerplate text, graphics, and non-relevant text can be ignored or filtered out by the text extraction module. The output of the query feature extraction module 144 is used to generate topic models via the classification engine component 140. The classification engine component 140 produces hierarchical categories that form a topic model for the webpage as shown in FIG. 3B.

Figure 3B:
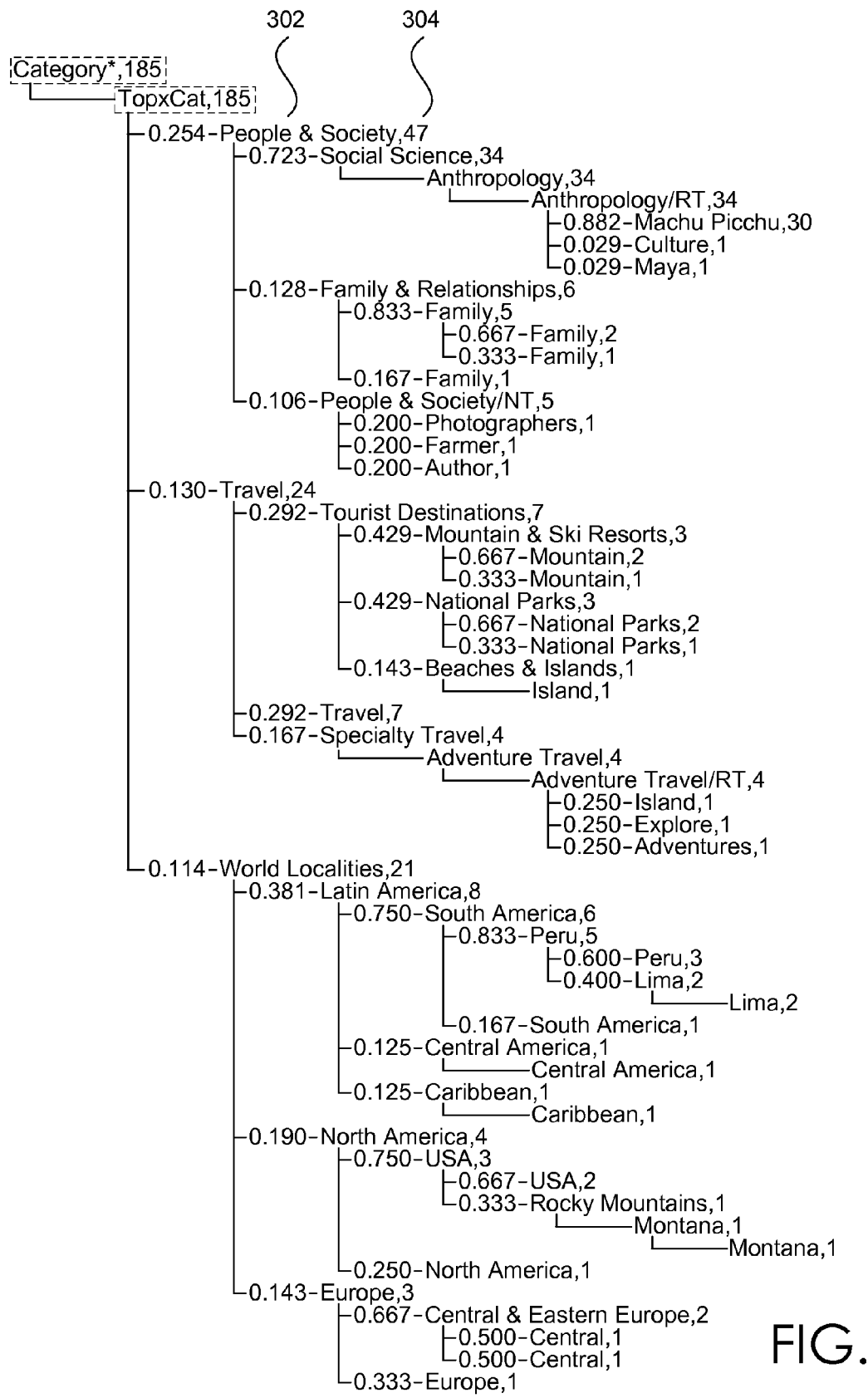

In FIG. 3B, the category nodes are shown from left to right and from top to bottom. Numeric values from the graph branches indicate relative contribution of the category to the topic model. By way of example, 0.254 for "People and Society" 302 indicates that roughly 25% of the topic model for the webpage relates to this general category. The "47" 304 at the end of the path may indicate the raw term frequency (TF) or the count of the number of times that a feature/term was encountered in the query document. In alternative implementations, this TF score may be scaled or normalized to compensate for large variations in document length.

It is contemplated that topic models can be generated using different sizes of categorizer indexes having different sets of example documents for selected domains. Multiple categorizer indexes or ontologies can be used for the same query FV. Categorizer index 130 may be specifically configured for particular interested parties such that the categorizer index is tailored to a particular ontology. Web content may be analyzed based on a categorizer index not specifically built for the web content. Other variations and combinations of categorizers and running queries on one or more categorizers are contemplated with embodiments of the present invention.

A topic model can further comprise a set of categories organized into a hierarchical category structure where category nodes in the tree towards the root indicate more general categories, and nodes closer to the leaf levels indicate increasing more specific topics. The depiction of the topic model, based on categories in the categorizer index, in the manner set forth in FIG. 3B is merely exemplary and other graphical depictions of topic models based on hierarchical category data in a categorizer index are contemplated with embodiments of the present invention.

Figure 3C:
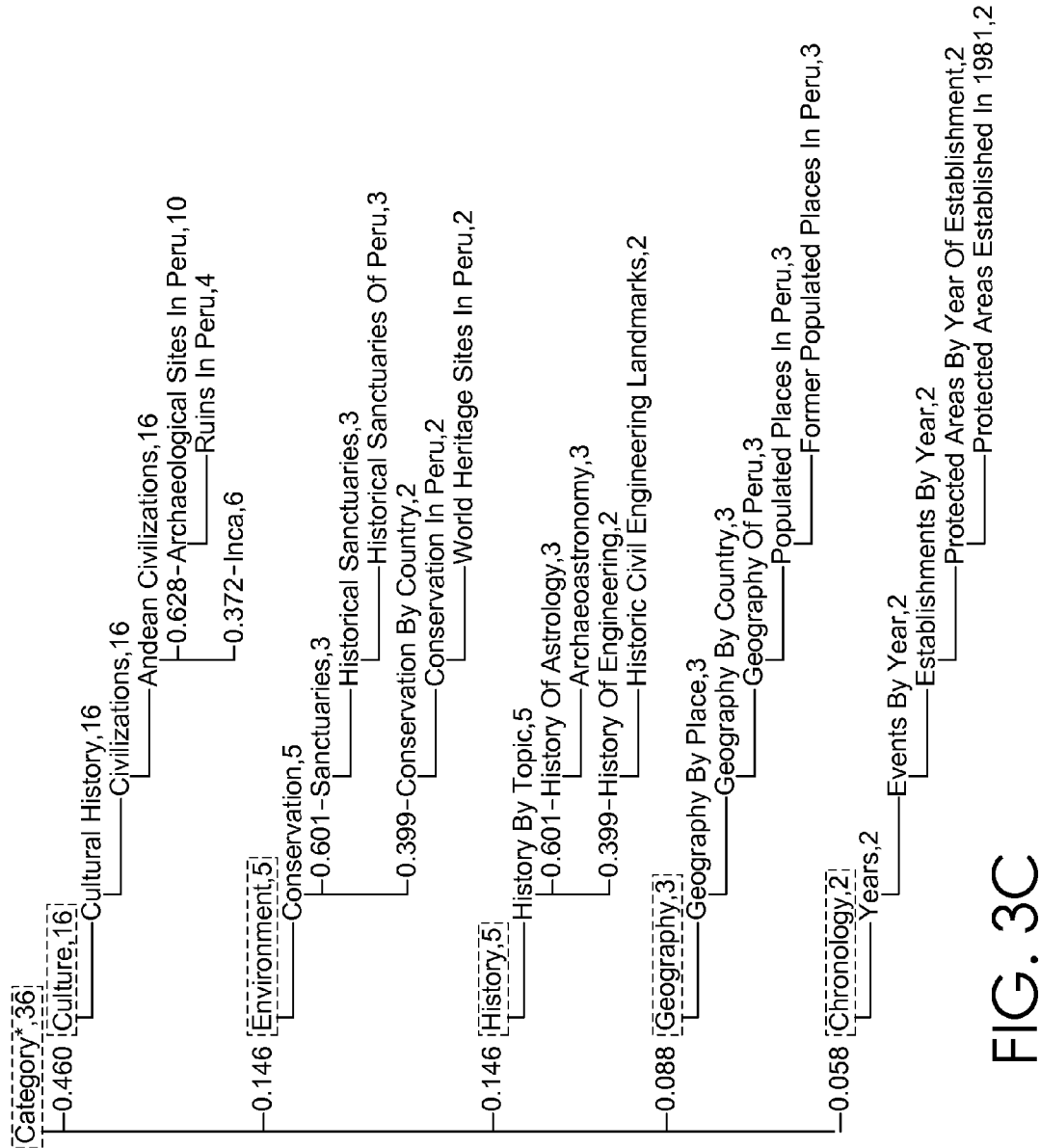

With reference to FIG. 3C, FIG. 3C illustrates a more complex topic model based on using a general purpose categorizer index. The general purpose categorize can be generated using knowledge corpus of documents from an external corpus spanning over a million different categories. An external corpus of this size provides an ontology structure that is pre-existing, automatically maintained and kept up-to-date, and available in multiple languages. In this regard, the knowledge corpus can be processed and learned from in a more robust and efficient manner. It is contemplated that the same query may be executed again a specific domain categorizer index and a general purpose domain categorizer index for comparative analysis topic models to discover consumer disposition.

With reference to FIGS. 4A and 4B, web content can be specifically converted into query FVs and executed against the categorizer index 130 to generate topic models for the web content. As such, topic models can be generated for query FVs generated from entire webpages of a website or a set of pages that form the set website. A topic model can be generated for a working set of pages that are of interest to an interested party. By way of example, a topic model can be constructed for over 600 pages for a snapshot of the NATIONAL GEOGRPAHIC website, as partially depicted in FIG. 4A. Category nodes are indicated by circles with labels. The labels on the left are used to represent more generic parent topic categories with nodes toward the right become increasing more specific. The output provides a way for consumers to view and navigate the topical contents of a website and also provide interested parties (e.g., content publisher) with a topic inventory when approaching new advertisers to demonstrate relevance of the advertiser's product to the website.

In another embodiment of the present invention, the pages visited by a specific user or user segment can be analyzed and modeled in a topic model having hierarchical classification structures, as partially depicted 4B. For example, the 20+ most recent pages of a selected user can be analyzed and the topic model, shown in FIG. 4B, is then aggregated to indicate the key topics of interest to the particular user. In another example, the topic model may be for pages seen by a user for a particular date range. Other variations and combinations of identifying a set of webpages associated with a visitor during a defined period of time are contemplated with embodiments of the present invention. The topic model can provide a comprehensive at-a-glance summary of a user or a user segment disposition for certain topics which an interested party can easily understand.

To compute the topic model for user or user segment disposition, the invention determines a core topic model of all the topics on the web pages that a visitor views in a particular window of time. In the example in FIG. 4B, for a one week period, at the top level of the topic model, the "People & Society" 400 topic category received the highest score of 0.1475, followed by "Science" 402 with a score of 0.1366, etc. At the next subcategory level under "People & Society" 400, mentions of "society" 404 and topic "Social Sciences" 406 received the highest scope with contributions of 0.2627 and 0.2581, respectively. As such, the scores in parenthesis in FIGS. 4A and 4B indicate the relative contribution of a category to the parent category. Scores for all immediate categories under a parent category (terms that form a column) can be configured to sum to 1.0 at the parent level (on the immediate left). In the particular case of FIG. 4B, there was only one child category matched (Anthropology), therefore the score contribution to the parent level is 1.0 or 100%.

Using the topic model for each user or user segment, topical interest for the user or user segment can be traced down to detailed leaf levels of the topic model tree for direct content and ad recommendations. Under "Social Sciences", the model reveals that "Anthropology" topics were likely the topics of interest under this subcategory. Further, there was likely interest in "civilization", "culture", and "Maya". In this regard, content inventory with other stories about ancient civilizations, the Mayan Empire, or pyramids or temples could be recommended. Similarly, an advertising inventory with Machu Picchu adventure vacation trips, best airfare to Lima, Peru, or 5-star hotels in Machu Picchu would get an increased conversion with users who exhibited the interest profile shown in the topic model. Scores indicating consumer disposition for an individual topic model categories can also be generated. A module can be used for generating scores associated with hierarchical categories. The scores may be used as indicators of consumer disposition as discussed above.

Figure 5:
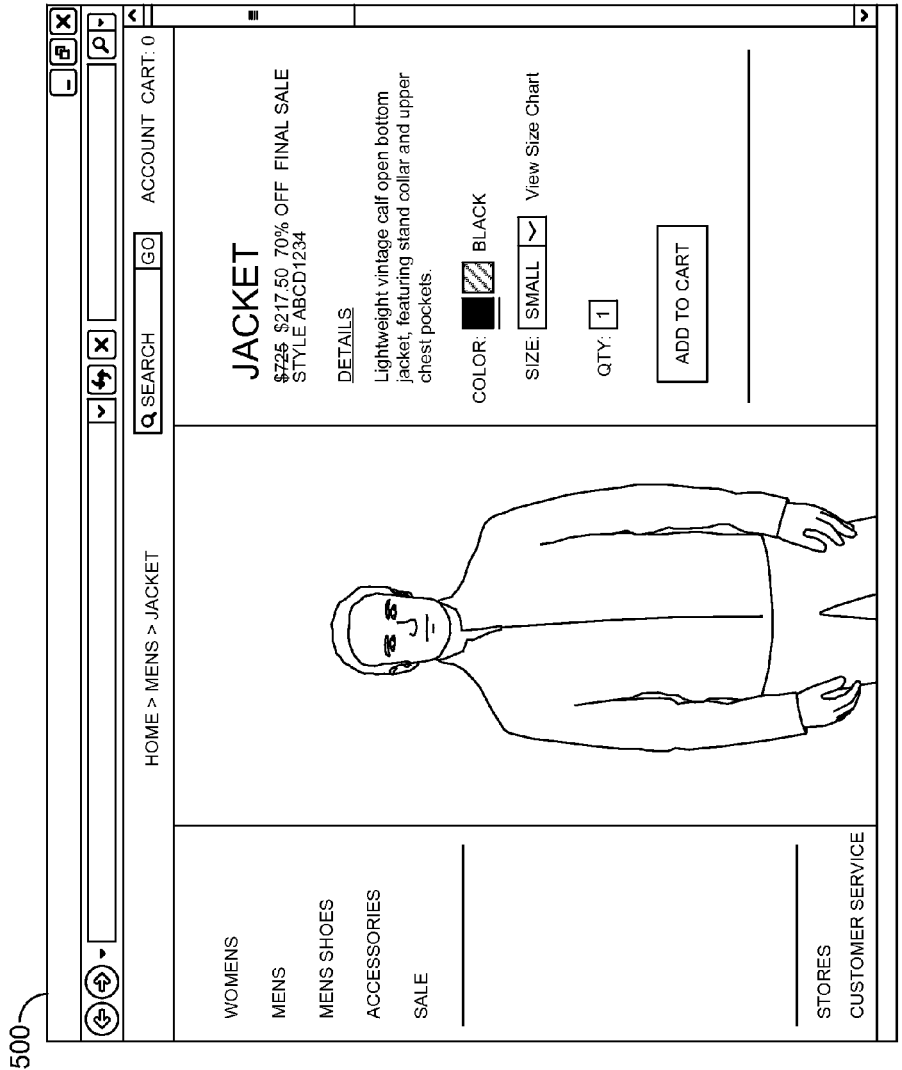
FIG. 5 is an exemplary web page for performing analytics based on hierarchical categorization of web content, in accordance with embodiments of the present invention.
Figure 6:
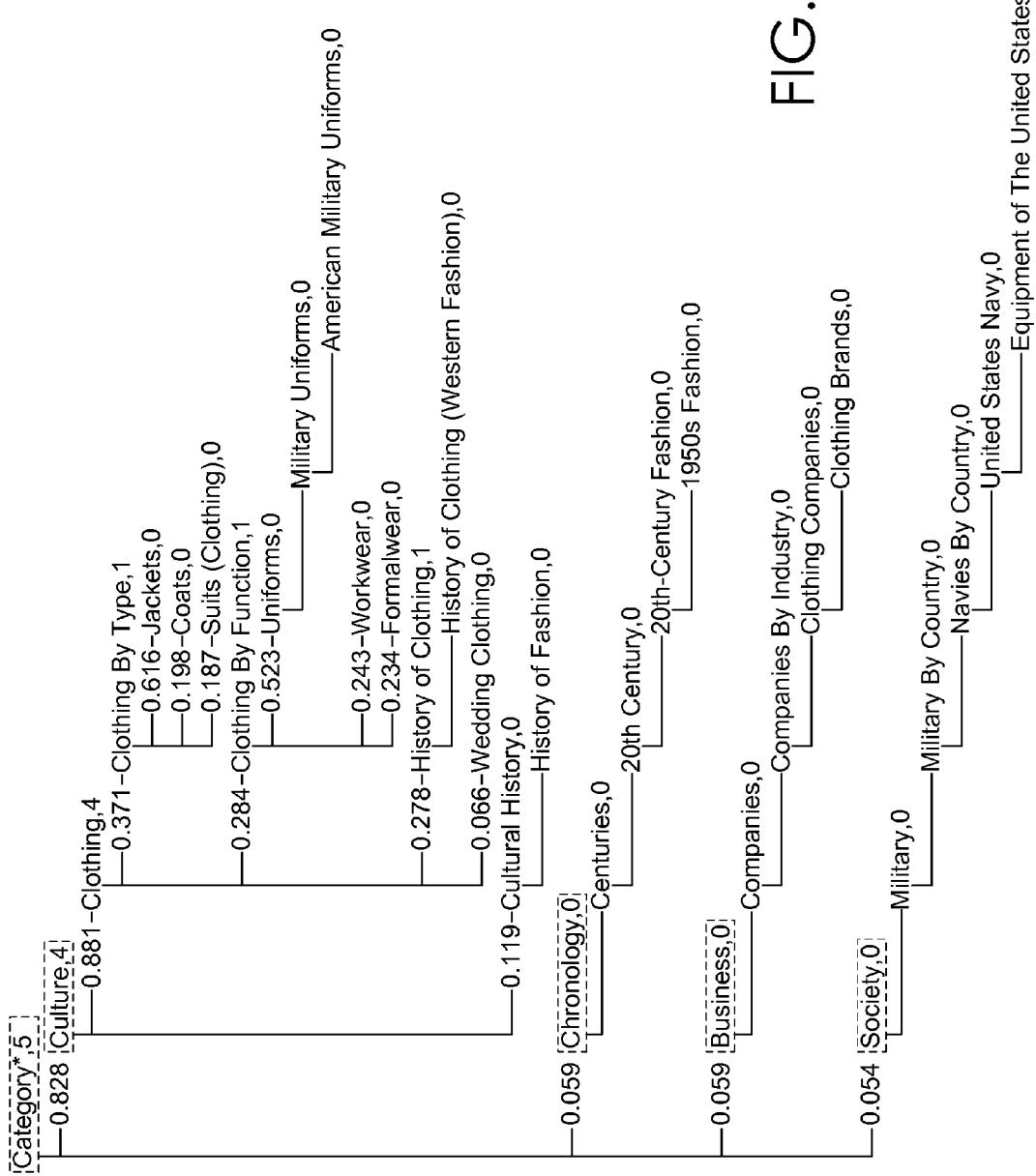
FIG. 6 is an exemplary topic model diagram for performing analytics based on hierarchical categorization of web content, in accordance with embodiments of the present invention.

Turning to examples in market strategy, interested parties (e.g., digital marketers and analyst) want to improve consumer analytics, prediction, and targeting accuracy. In this example, a URL from log data of web content may be used to determine consumer disposition. The URL provides context information that facilitates determining consumer disposition. Context information can include an IP address of the consumer who visited a site, a time the site was visited, and the specific page visited. With reference to FIG. 5, the page URL 500 can be further submitted to the classification engine component, in accordance with embodiments of the present invention. It is contemplated that query information may simply be indicated using an identifier (e.g., document identifier) of query content. As such, the entire topic model hierarchical classification structure can be extracted and then used to facilitate understanding of topics of interest. The output, as shown in FIG. 6, can indicate that clothing is a major topic for the webpage with subcategories about jackets, coats, and suits and additional categories relating to 1950s fashion and clothing brands. Additionally, because other articles in the knowledge corpus discuss related concepts, such as, clothing jackets popular in the military and military jackets, these topic categories are also provided through analysis via the topic model. In this case, the analysis indicates a potential interest of the consumer in jacket with a military cut or styling.

Similar to examples in digital publishing, the pages visited by a specific user or user segment can be analyzed and modeled in a topic model having hierarchical classification structures. The topic model may be for pages seen by a user for a particular date range. In this regard, moment-to-moment of aggregate consumer interest or purchase intent can be determined based on analysis of associated web content. For example, a near-real time analysis based on a topic models of topic product or series of topic product pages a user just visited would provide data to help efficiently predict products the user might be interested in buying.

Figure 7:
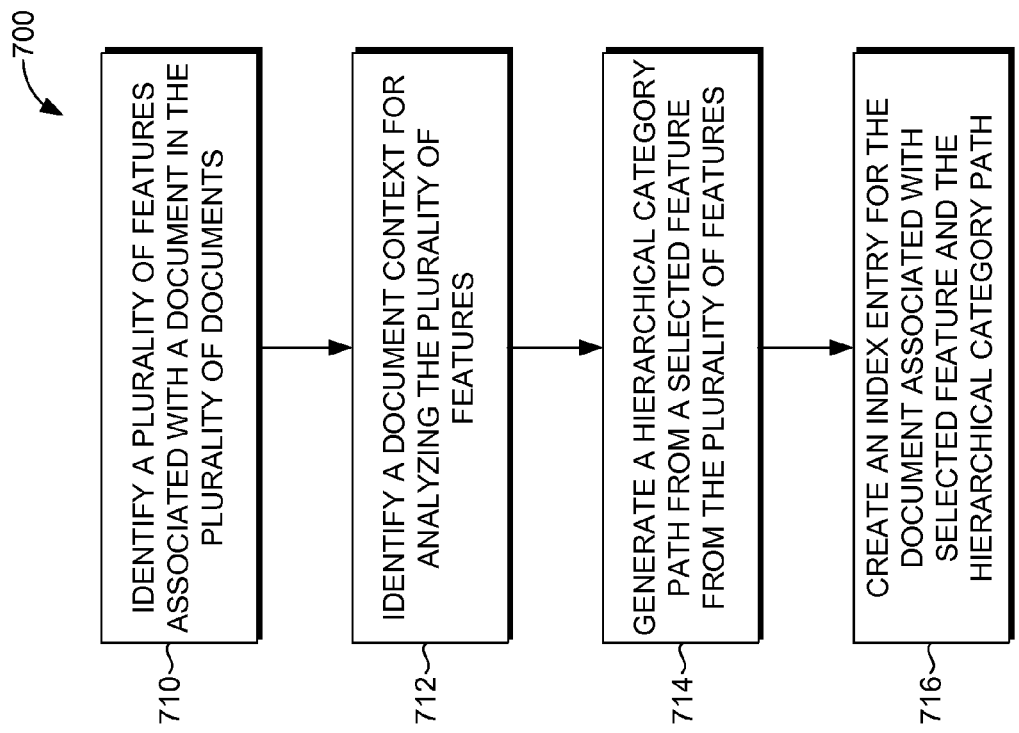
FIG. 7 is a flow diagram showing a method for performing analytics based on hierarchical categorization of web content, in accordance with embodiments of the present invention.

With reference now to FIG. 7, a flow diagram is provided that illustrates a method 700 for performing analytics based on hierarchical categories in accordance with an embodiment of the present invention. Initially, at block 700, a plurality of features associated with a document in the plurality of documents is identified. At block 712 a document context is identified for analyzing the plurality of features. At block, 714, a hierarchical category path is generated from a selected feature from the plurality of features. Generating the hierarchical category path may be based on analyzing the selected feature; the selected feature may be configured as feature vector in a feature vector space of the plurality of features, and identifying a shortest path from the feature vector to a root category associated with the document context. In embodiments where multiple feature vectors are selected, a k shortest paths is identified from the selected feature vectors to root categories. At block 716, an index entry for the document associated with the selected feature and the hierarchical category path.

Figure 8:
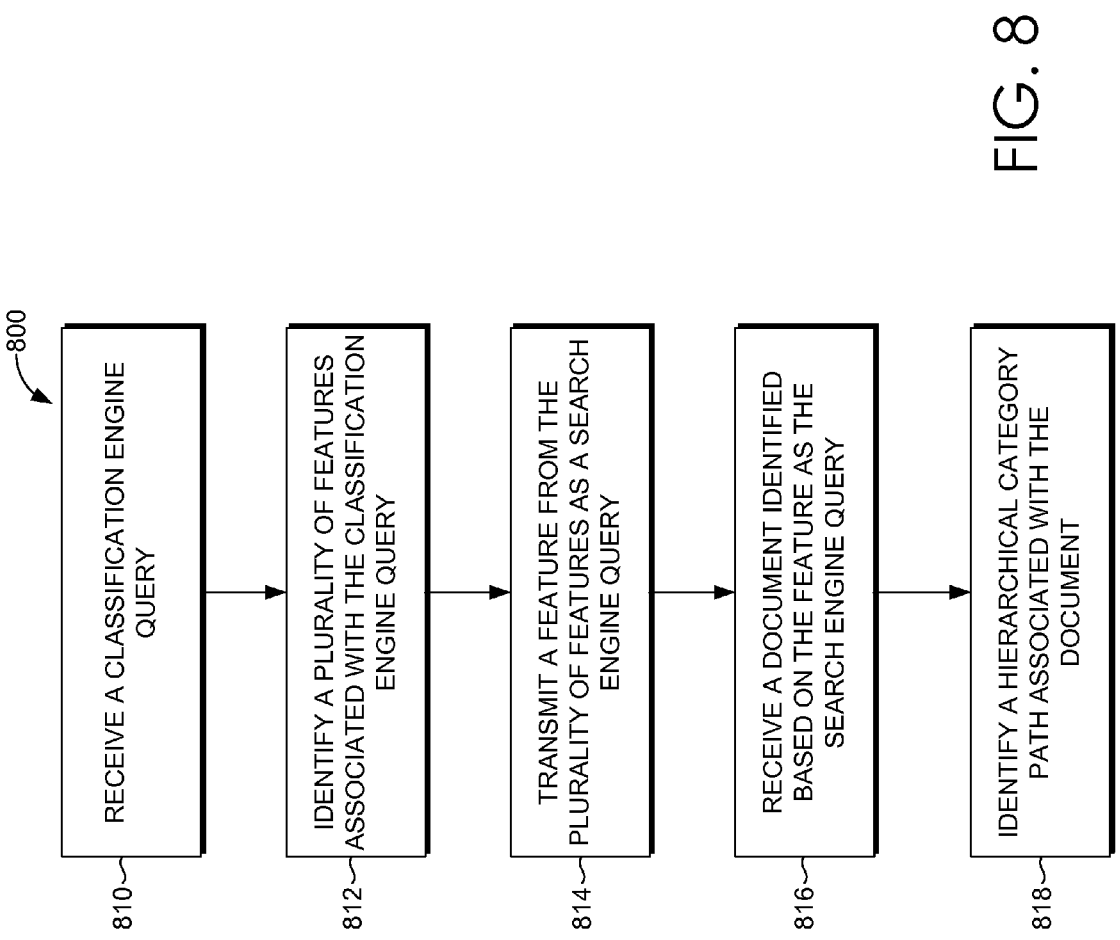
FIG. 8 is a flow diagram showing a method for performing analytics based on hierarchical categorization of web content, in accordance with embodiments of the present invention.

With reference now to FIG. 8, a flow diagram is provided that illustrates a method 800 for performing analytics based on hierarchical categories in accordance with an embodiment of the present invention. Initially at block 802, a classification engine query is received. The classification engine query may include content or reference content to be executed against a search engine with access to a categorizer index. At block 804, a plurality of features, associated with the content referenced by the classification engine query, are identified. The plurality of features can be represented as feature vectors in a vector space of the plurality of features.

At block 806, a feature may be transmitted as a search engine query. When the feature is represented as a feature vector, a search engine query feature vector is transmitted to the search engine. At block 816, a document is received; the document is identified based on the feature as the search engine query. It is contemplated that several documents may be identified, specifically, the documents may be identified using the search engine query feature vectors, and the documents are identified based on a similarity between the search engine query feature vectors and feature vectors in the categorizer index.

At block 818, hierarchical category paths associated with the document are identified. In embodiments, a topic model comprising the hierarchical category paths can be created. Upon creating the topic model, topic model scores associated with the hierarchical category paths are generated. The topic model comprising the hierarchical category path and the path score is communicated for performing web analytics. For example, an analytics application can be configured for receiving the topic model of the classification query, analyzing enumerated category topics in the topic model, and automatically generating additional web content for the web content associated with the classification query, the additional web content is associated one or more web marketing techniques such as segmenting, advertising, and targeting.

Having briefly described an overview of embodiments of the present invention, an exemplary operating environment in which embodiments of the present invention may be implemented is described below in order to provide a general context for various aspects of the present invention. Referring initially to FIG. 9 in particular, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 9:
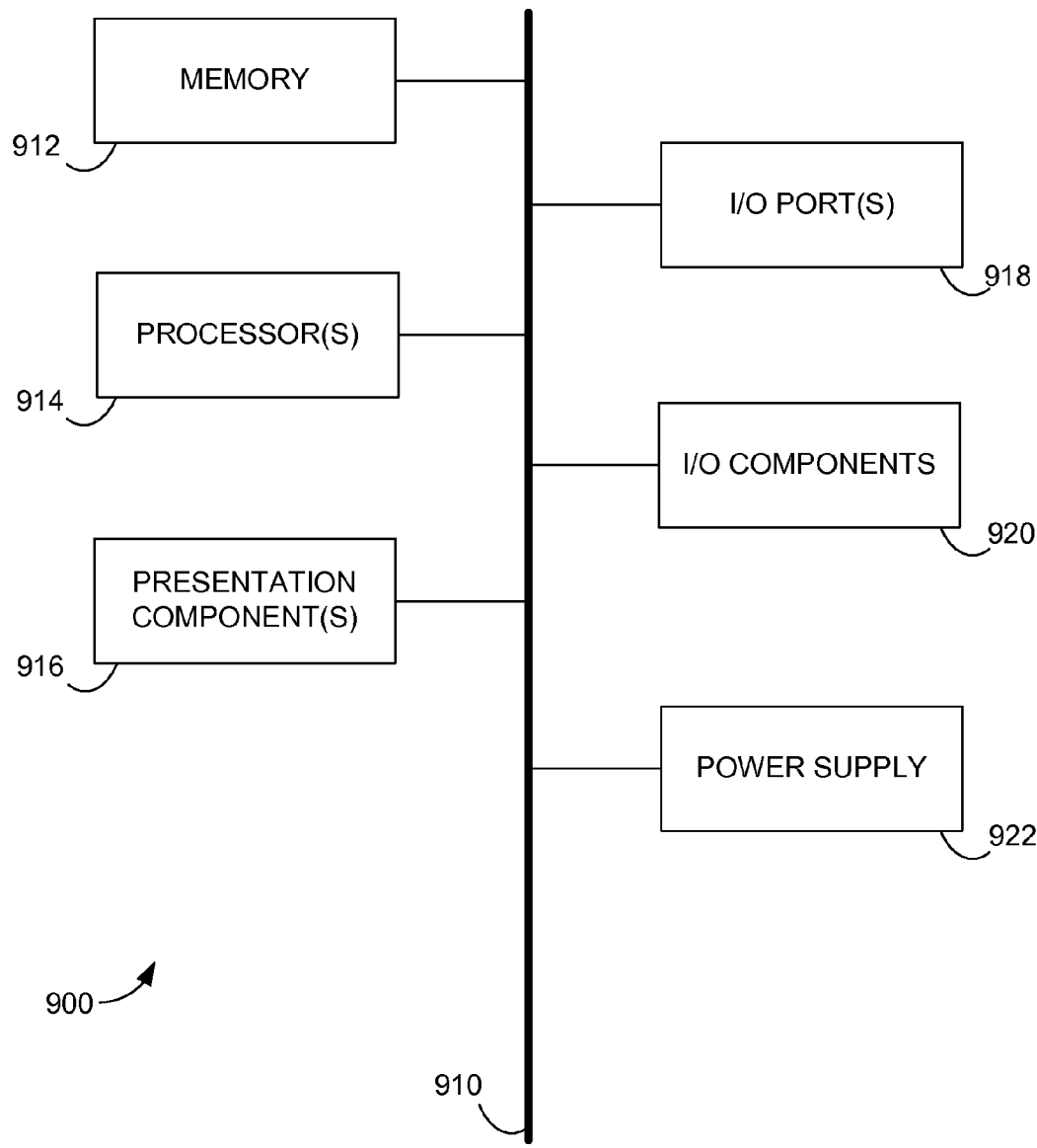
FIG. 9 is a block diagram of an exemplary computing environment suitable for use in implementing embodiments of the present invention.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 9 is merely illustrative of an exemplary computing device that can be used in connection with one or more embodiments of the present invention. Distinction is not made between such categories as "workstation," "server," "laptop," "hand-held device,"

etc., as all are contemplated within the scope of FIG. 9 and reference to "computing device."

Computing device 900 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc. I/O ports 918 allow computing device 900 to be logically coupled to other devices including I/O components 120, some of which may be built in. Illustrative I/O components 920 include a microphone, joystick, game pad, scanner, hard/soft button, touch screen display, etc.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A system for performing analytics based on hierarchical categories, the system comprising:
   one or more processors;
   one or more computer storage media, coupled with the one or more processors, having instructions stored thereon, which, when executed by the one or more processors, cause the computing system to provide:
   a categorizer index build component configured to perform:
   identifying a plurality of features associated with a document selected from a plurality of documents in a knowledge corpus, wherein the knowledge corpus comprises a category ontology;
   identifying a document context for analyzing the plurality of features;
   generating, for a selected feature, a hierarchical category path using the document context and the plurality of features, wherein the hierarchical category path is an enumeration of a root category and corresponding one or more subcategories, wherein the hierarchical category path is generated using the category ontology of the knowledge corpus; and
   creating, in a categorizer index, an index entry for the document associated with the selected feature and the hierarchical category path, wherein the categorizer index comprises index entries that correspond to a categorized plurality of documents from the plurality of documents in the knowledge corpus; and
   a classification engine component configured to perform:
   receiving a classification engine query;
   identifying a plurality of features associated with the classification engine query;
   transmitting a feature from the plurality of features as a search engine query;
   receiving a first document identified based on the feature as the search engine query; and
   based on the first document identified using the feature from the classification engine query, identifying, using the categorizer index comprising a plurality of categorized documents associated with selected features and corresponding hierarchal category paths, a first hierarchical category path associated with the first document, wherein the first hierarchical category path is associated with the first document based on a corresponding index entry identified for the first document in the categorizer index associated with the category ontology.

2. The system of claim 1, further comprising:
   an index search engine configured to perform:
   receiving the search engine query as a feature vector in a vector space of a plurality of feature vectors in the query;
   accessing the categorizer index of documents associated with the plurality of feature vectors;
   identifying the first document based on a similarity between the search engine query feature vector and the plurality of feature vectors.

3. The system of claim 1, further comprising:
   a scoring module configured to perform:
   computing a score for enumerated category topics in the first hierarchical category path; and
   computing an individual hierarchical category path score by summing the score of the enumerated categories in the first hierarchical category path.

4. The system of claim 1, further comprising:
a tagging component configured to perform:
tagging content associated with the classification engine query with a hierarchical category path tag generated based on the hierarchical category path, wherein the hierarchical category path tag is defined for the content using tagging rules.

5. The system of claim 1, further comprising:
analytics application configured to perform:
receiving a topic model for the classification query, wherein the topic model comprises a plurality of hierarchical category paths including the first hierarchical category path;
analyzing enumerated category topics in the topic model to generate additional web content, the enumerated topics having individual scores;
automatically generating additional web content for the web content associated with the classification query, wherein the additional web content is associated with one or more web marketing techniques.

6. The system of claim 1, wherein the categorizer index build component and the classification engine component are scalable, wherein a scalable implementation of the categorizer index build component and the classification engine component leverages a plurality of processing nodes for parallel implementations of the categorizer index component and the classification engine component that utilize partitioning and distribution of a categorizer index across the plurality of processing nodes.

7. One or more computer storage media storing computer-useable instructions that, when executed by one or more processors, causes the one or more processors to perform a method comprising:
identifying a plurality of features associated with a document selected from a plurality of documents in a knowledge corpus, wherein the knowledge corpus comprises a category ontology;
identifying a document context for analyzing the plurality of features, wherein the document context is based on a plurality of root categories;
generating, for a selected feature, a hierarchical category path using the document context and the plurality of features, wherein the hierarchical category path is an enumeration of a root category and corresponding one or more subcategories, wherein the hierarchical category path is generated using the category ontology of the knowledge corpus;
creating, in a categorizer index, an index entry for the document associated with the selected feature and the hierarchical category path, wherein the categorizer index comprises index entries that correspond to a categorized plurality of documents from the plurality of documents in the knowledge corpus;
receiving a classification engine query;
identifying a plurality of features associated with the classification engine query;
transmitting a feature from the plurality of features as a search engine query;
receiving a first document identified based on the feature as the search engine query; and
based on the first document identified using the feature from the classification engine query, identifying, using the categorizer index comprising a plurality of categorized documents associated with selected features and corresponding hierarchal category paths, a first hierarchical category path associated with the first document, wherein the first hierarchical category path is associate with the first document based on a corresponding index entry identified for the first document in the categorizer index associated with the category ontology.

8. The media of claim 7, wherein generating the hierarchical category path further comprises:
analyzing the selected feature, wherein the selected feature is a feature vector in the as a feature vector space of the plurality of features;
identifying a shortest path from the feature vector to the root category associated with the document context; and
selecting the hierarchical category path from the shortest path.

9. The media of claim 7, wherein creating an index entry further comprises:
generating a search-platform-formatted document comprising a title, text, and the selected feature, wherein the title explicitly includes stop-words.

10. The media of claim 9, wherein the classification engine query comprises at least one Universal Resource Locator (URL) from a web log of a selected user or document identifier, wherein the URL or document identifier are received as classification engine queries based on one of: a near-real time workflow or a batch workflow.

11. The media of claim 8, further comprising:
generating scores for the hierarchical category path, wherein enumerated category topics are associated with individual scores.

12. The media of claim 7, further comprising:
tagging content, associated with the classification engine query, with a hierarchical category path tag generated based on the first hierarchical category path, wherein the hierarchical category path tag is defined for the content using tagging rules.

13. The media of claim 7, further comprising:
generating a topic model for the classification engine query, wherein the topic model comprises a plurality of hierarchical category paths including the first hierarchical category path; and
communicating the topic model, via an interface, for web analytics processing.

14. A computer-implemented method suitable for use in a computing environment utilizing a processor and a memory, the method comprising:
identifying a plurality of features associated with a document selected from a plurality of documents in a knowledge corpus, wherein the knowledge corpus comprises a category ontology;
identifying a document context for analyzing the plurality of features, wherein the document context is based on a plurality of root categories;
generating, for a selected feature, a hierarchical category path using the document context and the plurality of features, wherein the hierarchical category path is an enumeration of a root category and corresponding one or more subcategories, wherein the hierarchical category path is generated using the category ontology of the knowledge corpus; and
creating, in a categorizer index, an index entry for the document associated with the selected feature and the hierarchical category path, wherein the categorizer index comprises index entries that correspond to a categorized plurality of documents from the plurality of documents in the knowledge corpus;
receiving a classification engine query;
identifying a plurality of features associated with the classification engine query;

transmitting a feature from the plurality of features as a search engine query;

receiving a first document identified based on the feature as the search engine query;

based on the first document identified using the feature from the classification engine query, identifying, using the categorizer index comprising a plurality of categorized documents associated with selected features and corresponding hierarchal category paths, a first hierarchical category path associated with the first document, wherein the first hierarchical category path is associated with the first document based on a corresponding index entry identified for the first document in the categorizer index associated with the category ontology; and generating a topic model for the classification engine query, wherein the topic model comprises a plurality of hierarchical category paths including the first hierarchical category path, wherein the plurality of hierarchical category paths are identified using the index entries in the categorizer index for a set of documents, wherein the set of documents are based on the plurality of features associated with the classification engine query.

15. The method of claim 14, wherein the plurality of features are represented as feature vectors in a vector space of the plurality of features.

16. The method of claim 15, further comprising:

generating topic model scores associated with the hierarchical category paths of the topic model; and communicating a topic model comprising the hierarchical category path and the path score.

17. The method of claim 16, wherein generating topic model scores further comprises:

computing a score for enumerated category topics in the hierarchical category paths; and computing an individual hierarchical category path score by summing the score of the enumerated categories in the individual hierarchical category path.

18. The method of claim 16, further comprising tagging the web content with hierarchical category path tags using tagging rules, wherein tagging comprises:

selecting at least a subset of the hierarchical categories based at least in part on the scores of enumerated category topics;

identifying web content to tag with hierarchical categories; and embedding the hierarchical categories into metadata associated with the web content.

19. The method of claim 16, wherein tagging rules are based on one or more of:

weighting of selected enumerated category topics;

threshold scores for selecting enumerated category topics; and hierarchical category path lengths.

20. The method of claim 16, wherein communicating the topic model further comprises providing the topic model for display as additional web content associated with the web content, wherein the additional web content facilitates navigation of the web content.

* * * * *